US012490694B2

(12) United States Patent
Hill

(10) Patent No.: US 12,490,694 B2
(45) Date of Patent: Dec. 9, 2025

(54) SYSTEMS AND METHODS OF IRRIGATION NEED ASSESSMENT

(71) Applicant: HydroPoint Data Systems, Inc., Petaluma, CA (US)

(72) Inventor: James Andrew Hill, Garden City, ID (US)

(73) Assignee: HydroPoint Data Systems, Inc., Petaluma, CA (US)

( * ) Notice: Subject to any disclaimer, the term of this patent is extended or adjusted under 35 U.S.C. 154(b) by 0 days.

(21) Appl. No.: 18/902,493

(22) Filed: Sep. 30, 2024

(65) Prior Publication Data

US 2025/0113789 A1     Apr. 10, 2025

Related U.S. Application Data

(63) Continuation of application No. 18/314,016, filed on May 8, 2023, now Pat. No. 12,114,617, which is a continuation of application No. 17/011,591, filed on Sep. 3, 2020, now abandoned.

(60) Provisional application No. 62/895,550, filed on Sep. 4, 2019.

(51) Int. Cl.
*A01G 25/16*     (2006.01)

(52) U.S. Cl.
CPC ................... *A01G 25/167* (2013.01)

(58) Field of Classification Search
CPC .............................. A01G 25/16; A01G 25/167
See application file for complete search history.

(56) References Cited

U.S. PATENT DOCUMENTS

| | | | | |
|---|---|---|---|---|
| 7,789,321 B2 * | 9/2010 | Hitt | ...................... | A01G 25/167 |
| | | | | 239/207 |
| 8,538,592 B2 * | 9/2013 | Alexanian | .............. | G06Q 40/12 |
| | | | | 239/69 |
| 8,606,415 B1 * | 12/2013 | Woytowitz | ............. | A01G 25/16 |
| | | | | 455/39 |
| 8,660,705 B2 * | 2/2014 | Woytowitz | ........... | A01G 25/167 |
| | | | | 239/63 |
| 8,712,592 B2 | 4/2014 | Carlson et al. | | |
| 8,793,024 B1 * | 7/2014 | Woytowitz | ........... | A01G 25/167 |
| | | | | 239/723 |
| 10,602,682 B1 * | 3/2020 | Wardle | ................. | G05B 19/042 |
| 10,743,483 B1 * | 8/2020 | Melrose | ............... | G05B 19/042 |
| 10,955,402 B2 * | 3/2021 | Basheer | ............... | G01N 33/246 |
| 2005/0211791 A1 * | 9/2005 | Clark | ................... | A01G 25/167 |
| | | | | 239/69 |

(Continued)

FOREIGN PATENT DOCUMENTS

| | | | | |
|---|---|---|---|---|
| WO | 2013042113 A1 | 3/2013 | | |
| WO | WO-2017133625 A1 * | 8/2017 | ............. | A01G 25/16 |

(Continued)

*Primary Examiner* — Monica L Perry
*Assistant Examiner* — Aaron M Rodziwicz
(74) *Attorney, Agent, or Firm* — Foster Garvey PC

(57) ABSTRACT

An irrigation needs assessment system and method used to determine irrigation needs of one or more participants. The irrigation needs assessment system determines irrigation needs based on weather conditions, forecast weather conditions, plant water uptake, and ground moisture content information. Evaporation rate information is also provided from one or more other participants of the irrigation needs assessment service.

20 Claims, 12 Drawing Sheets

(56) References Cited

U.S. PATENT DOCUMENTS

| | | | |
|---|---|---|---|
| 2005/0216130 A1* | 9/2005 | Clark | A01G 25/16 239/69 |
| 2009/0216345 A1* | 8/2009 | Christfort | G05B 19/0428 455/39 |
| 2010/0094472 A1* | 4/2010 | Woytowitz | A01G 25/167 700/284 |
| 2011/0093123 A1* | 4/2011 | Alexanian | A01G 25/16 700/284 |
| 2014/0343737 A1* | 11/2014 | Nguyen | G05B 19/0423 700/284 |
| 2015/0272017 A1 | 10/2015 | Hedley et al. | |
| 2019/0110415 A1* | 4/2019 | Walker | G05B 13/021 |
| 2019/0124858 A1* | 5/2019 | Sarver | A01G 25/16 |
| 2021/0059136 A1 | 3/2021 | Hill | |

FOREIGN PATENT DOCUMENTS

| | | |
|---|---|---|
| WO | 2019033158 A1 | 2/2019 |
| WO | 2021046210 A1 | 3/2021 |

\* cited by examiner

SYSTEMS AND METHODS OF IRRIGATION NEED ASSESSMENT

CROSS-REFERENCE TO RELATED APPLICATIONS

This application is a continuation of U.S. patent application Ser. No. 18/314,016, filed May 8, 2023, which is a continuation of U.S. patent application Ser. No. 17/011,591, filed Sep. 3, 2020, which claims the benefit of priority of U.S. Patent Application No. 62/895,550, filed Sep. 4, 2019, each of which is incorporated by reference in their entireties.

TECHNICAL FIELD

The present disclosure relates generally to the field of providing irrigation to agricultural land.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

Figure 1:
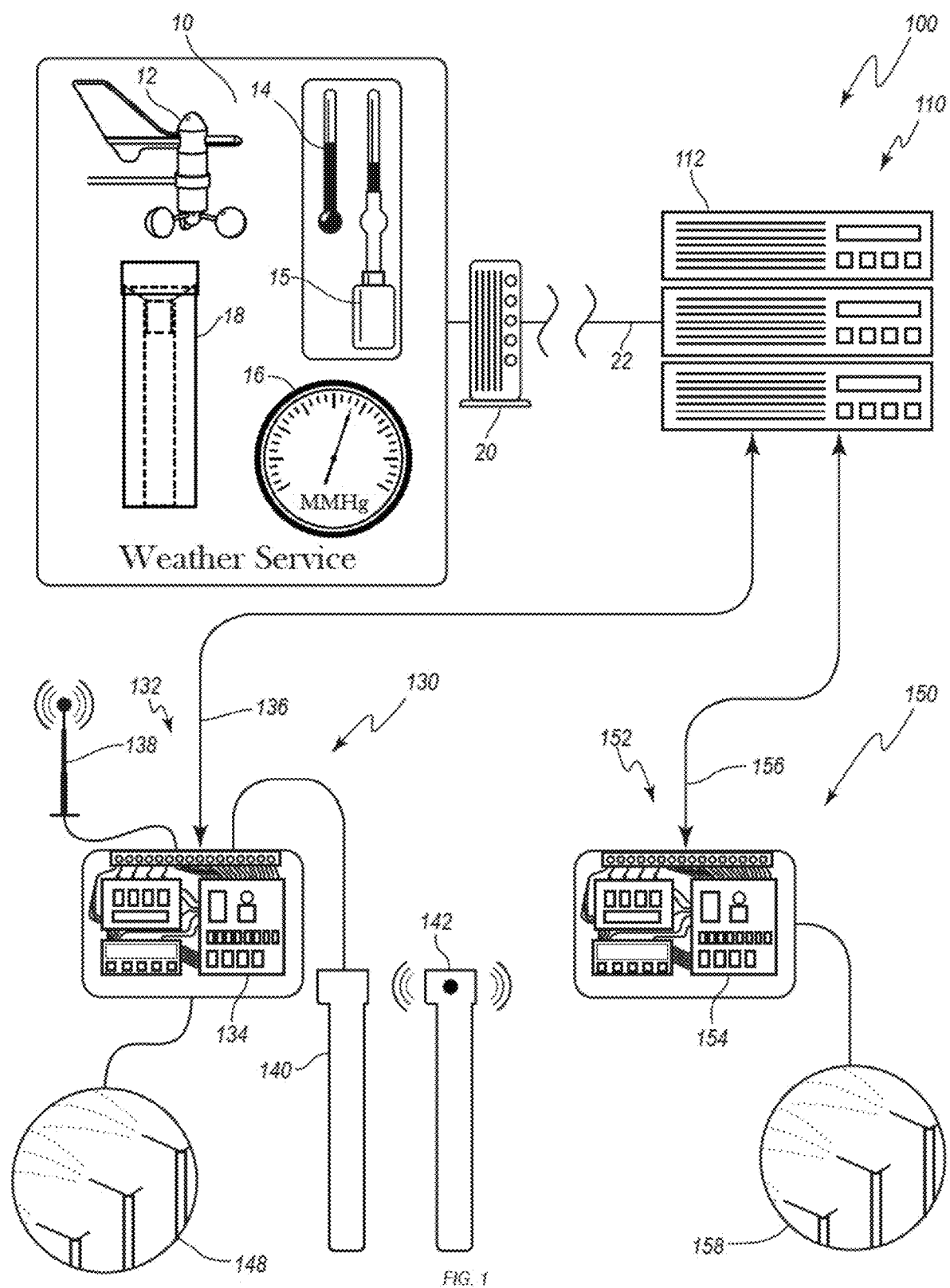
FIG. 1 is a diagram of an irrigation needs assessment service ("INAS"), according to an embodiment of the present disclosure.

Many irrigation systems schedule irrigation (delivery of water to an irrigation site) to occur on a recurring basis, often without direct reference to the ground moisture content ("GMC"). Irrigation without direct reference to current GMC may lead to over watering or under watering. Over watering wastes water which may result in unnecessarily high water costs. Further, severe over watering may lead to plant damage (and corresponding crop yield reduction), loss of soil, and localized flooding. Under watering may lead to plant damage or loss (and corresponding crop yield reduction), and may also exacerbate a subsequent occurrence of over watering. For example, if a site is under watered in sufficiently hot, dry conditions, plants may die off to the point that the roots no longer support soil retention such that a subsequent over watering may permit soil to erode away.

Irrigating on a recurring schedule without direct reference to GMC conditions may have substantial adverse economic and ecological effects. For example, a farmer using a recurring irrigation schedule without direct reference to actual GMC will likely incur the same irrigation costs regardless of whether a bumper crop is produced or the crop is substantially damaged due to over and/or under watering. As noted above, under some conditions, under and over watering may lead not only to crop damage, but also to soil damage requiring expensive and time-consuming intervention to mitigate. Furthermore, while irrigating on a fixed and recurring schedule may allow for a degree of water delivery planning, it may also lead to over demand against a limited water supply, creating a strain on water delivery systems. In some areas, agricultural and residential demands on water supplies create supply conflicts leading to governmental intervention, such as imposition of quotas against delivery systems and water consumers.

Irrigation that is responsive not only to plant demands but also actual GMC may alleviate the foregoing and other economic and ecological issues. An irrigation system that provides irrigation based on actual needs may avoid plant damage due to under watering, and soil loss due to over watering. Irrigating as appropriate based on GMC may conserve water while still ensuring adequate water for plant needs.

For an irrigation system to be responsive to GMC, often local moisture sensors are utilized. However, employment of local moisture sensors may increase the cost of an irrigation system. An array of in-ground moisture sensors (ground moisture content sensors, "GMC sensors," or "GMCS") may be deployed and configured to communicate with a computer, with the computer configured to receive data from the array of GMC sensors, and from a local or regional weather service in order to determine a current irrigation need based on the current GMC, the plant type, the current weather conditions, and the foreseeable weather conditions. Additionally, automating such a system may require deployment of controllers capable of activating/deactivating pumps, as well as opening and closing valves. Advances in computing technology have substantially reduced some of these costs associated with automation.

Further cost mitigation may be achieved by distributing some of the equipment across a region such that multiple irrigation sites may benefit from monitoring GMC. For example, if Irrigation Site A has deployed GMC sensors and a local computer network to control local irrigation, Irrigation Site B, Irrigation Site C, etc. located near Irrigation Site A may be able to use the GMC data from Irrigation Site A, along with weather conditions, to similarly assess irrigation needs at each of Irrigation Site B, Irrigation Site C, etc. Furthermore, the GMC data from Irrigation Site A may be supported or augmented by GMC data from Irrigation Site L, another Irrigation Site in the area having a GMC sensor array.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Irrigation of an irrigation site occurs in many forms. Rain-fed irrigation may be natural delivery of water to an area, as by rainfall.

Surface irrigation may be delivery of water to and across an irrigation site. Some surface irrigation may be performed using predominantly gravity effect with no mechanical pump. Surface irrigation may include, in some instances, a pump to deliver (lift) water from a storage facility, such as a well, pond, canal, etc., to a water delivery system, wherein the water delivery system employs predominantly gravity to deliver water to and across an irrigation site. The water delivery system may employ manually or mechanically operated gates to permit/interrupt the gravity-fed flow of water to a portion of an irrigation site. Examples of surface irrigation include flooding, furrows, and contouring.

Localized irrigation refers to delivery of water under low pressure through a piped network to individual plants. Drip irrigation is a form of localized irrigation in which water is delivered at or near the roots of individual plants.

Sprinkler irrigation may deliver water to an area of an irrigation site by a collection of sprinklers served by a pipe network. The pipe network may be fixed or movable. The water may be pumped into or through the pipe network. Pumping the water into/through the pipe network creates a pressure within the pipe network facilitating the use of sprinklers to distribute the water across the irrigation site.

Center pivot irrigation may be a form of sprinkler irrigation in which one or more sprinklers are mounted to a common overhead pipe structure supported by wheels and having a central pivot point about which the overhead pipe structure rotates. Water is pumped into the overhead pipe structure at the center pivot, travels through the overhead pipe structure, and is delivered via sprinklers to an irrigation area over which the pipe structure travels.

Lateral move irrigation may be a form of sprinkler irrigation similar to center pivot irrigation wherein sprinklers are mounted to a pipe structure supported by wheels; however, in a lateral move irrigation system, there is no central pivot and the pipe structure advances across an area of an irrigation site. In some lateral move irrigation systems, the pipe structure is manually or mechanically switched from one supply hose or pipe to the next for each area served. The pump may be located on either end of the pipe structure, or at the source of water (well, pond, lake, canal, etc.).

An aim of irrigation is to increase an amount of water in the soil, or GMC. GMC may refer more specifically to plant available water, meaning the water that a plant can draw from within the soil. Sensors may be utilized to measure and/or provide feedback as to the relative amount of water in the soil or GMC. An in-ground moisture sensor may be a sensor that measures moisture at or below the surface of the ground and is also configured to measure the relative amount of water in the soil (e.g., GMC) adjacent the sensor.

Field capacity may refer to a maximum amount of moisture a particular soil can absorb. Delivery capacity may refer to an amount of water an irrigation system can deliver to an irrigation area.

Permanent wilting point, as used herein, refers to moisture in a particular soil which cannot be drawn by a plant sufficiently to sustain the plant without the plant suffering damage. By way of example, a permanent wilting point in a sandy soil may be 5% to 10% moisture by volume, meaning when the sandy soil contains less than approximately 10% moisture by volume, a plant in the sandy soil will be unable to draw sufficient water to sustain itself.

Generally, plant available water is a quantity of moisture in a particular soil between the permanent wilting point and the field capacity of the soil.

Plant water uptake, as used herein, refers to the ability of an agricultural crop plant (generally, a vascular plant) to absorb water from soil surrounding the plant through the plant's root system. Plant water uptake rate refers to the capacity or volume of moisture which the plant, under normal conditions, is able to absorb. Plant water uptake rate may vary during the life cycle of the plant, and typically increases as the plant matures.

Modulating (and modulating of) irrigation refers to a change of the rate of delivery of water (discharge rate) in an irrigation system capable of being configured to deliver (discharge) water at different rates. For example, a particular irrigation system (multi-rate irrigation system) may be capable of delivering (discharging) water at a rate of two-tenths inch per hour (0.2"/hr) at one configuration, and at 0.5"/hr at another configuration. Modulation of irrigation occurs when a multi-state irrigation system is delivering water at one rate of discharge and a change is made to deliver water at another rate of discharge.

Moreover, the phrases "connected to" and "coupled to" are used herein in their ordinary sense, and are broad enough to refer to any suitable coupling or other form of interaction between two or more entities, including mechanical, fluid, and thermal interaction. Two components may be coupled to each other even though they are not in direct contact with each other. The phrase "attached to" refers to interaction between two or more entities which are in direct contact with each other and/or are separated from each other only by a fastener of any suitable variety (e.g., an adhesive, stitching, etc.).

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand.

The terms "a" and "an" can be described as one, but not limited to one. For example, although the disclosure may recite a GMC sensor at a site, the disclosure also contemplates that the site can have two or more GMC sensors.

Unless otherwise stated, all ranges include both endpoints and all numbers between the endpoints.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

FIG. 1 is a diagram of an irrigation needs assessment service 100 according to an embodiment of the present disclosure. The irrigation needs assessment service ("INAS") 100 may utilize various data, such as, e.g., GMC, weather information, evaporation rate of water, plant water uptake rate, etc., to activate, deactivate and otherwise operate an irrigation system for an agricultural endeavor; and, furthermore, may contribute to the operation of an irrigation system for another agricultural endeavor.

The INAS 100 comprises an INAS network 110. The INAS network 110 may be a logical computing network hosted on one or more network servers 112. An INAS network server 112 may include a processor and may further include a data storage device. More particularly, one or more physical computing devices may operate as a logical network services provider, hereafter referred to as "network server 112." The data storage device may include machine-readable and executable instructions that the one or more processors may execute to perform various computations, functions, and services of the INAS network 110.

The INAS network 110 may communicate across a network connection 22 with a weather service, such as a local, regional, or national weather service 10. The weather service 10 may comprise a plurality of weather instruments such as, e.g., a wind vane/anemometer 12, a thermometer 14, a wet bulb thermometer 15, a barometer 16, a precipitation gauge 18, etc. The weather instruments 12, 14, 15, 16, 18 illustrated are by way of example, and may not each be present at a particular weather service, or may be supplanted or augmented by other weather instruments. The weather service 10 may further comprise a communication module 20 to facilitate communication with other facilities, which may include the INAS network 110.

The INAS network 110 comprises a participant-contributor system 130 and a participant-consumer system 150. The participant-contributor system 130 comprises an irrigation control center 132, one or more ground moisture content sensors ("GMC sensors") 140, 142, and at least one irrigation system 148. The irrigation control center 132 of the participant-contributor system 130 may further comprise a processor 134 and a communication module.

The processor 134 may be configured to receive GMC data and optionally other data such as weather data to calculate (e.g., estimate approximate, predict, etc.) an irrigation need. The irrigation need may be an amount of water to be provided by an irrigation system to maintain an appropriate and/or desired GMC of an area irrigated by an irrigation system, even if that area does not contain a GMC sensor. An irrigation need may be calculated a variety of ways and may be based on one or more factors including but not limited to evaporation rate from the soil, transpiration rate of plants in the area, and natural water sources. In one embodiment of the present disclosure, an irrigation need may be based on evapotranspiration (ET), which is a combination of water that is lost from the soil through evaporation and through transpiration from plants. In another embodiment, an irrigation need may comprise a reference crop evapotranspiration or reference evapotranspiration ($ET_0$). In another embodiment, an irrigation need may be determined based on GMC data or other data to estimate evapotranspiration (ET) or reference evapotranspiration (ETo). For sake of simplicity, the embodiments described herein are at times explained according to ET or $ET_0$ as an example of an irrigation need, and it will be appreciated by those skilled in the art that other forms of determining or otherwise representing an irrigation need are encompassed by the present disclosure and the embodiments described herein.

The irrigation need may be localized to an area of a GMC sensor 140, 142. The irrigation need may also be localized to an area served by a particular irrigation system 148 of the particular irrigation control center 132, to a particular (configurable or selectable) area served by the irrigation control center 132, or to the entire area served by the irrigation control center 132. Similarly, an irrigation area may be an area localized to a GMC sensor site for each GMC sensor 140, 142 (e.g., an area serviceable by a GMC sensor 140, 142). An irrigation area may also be localized to an area served by a particular irrigation system 148 of the particular irrigation control center 132, to a particular (configurable or selectable) area served by the irrigation control center 132, or to the entire area served by the irrigation control center 132.

Each GMC sensor 140, 142 of the irrigation control center 132 may be an in-ground moisture sensor. Each GMC sensor 140, 142 of the irrigation control center 132 may be a wired GMC sensor 140, or a wireless GMC sensor 142. In some embodiments, the GMC sensors 140, 142 may measure and/or provide feedback as to the relative amount of water in the soil. In some embodiments, the GMC sensors 140, 142 may measure moisture at or below the surface of the ground in adjacent soil. Data from the GMC sensors 140, 142 may be validated, such as using methods described in U.S. Pat. No. 8,712,592.

The processor 134 may also receive, as from an input device or from a memory, data regarding a plant water uptake rate, and may employ the plant water uptake rate along with GMC data and weather data to calculate an irrigation need. Plant water uptake rate may be determined based on the type of plant near each GMC sensor 140, 142.

Figure 3A:
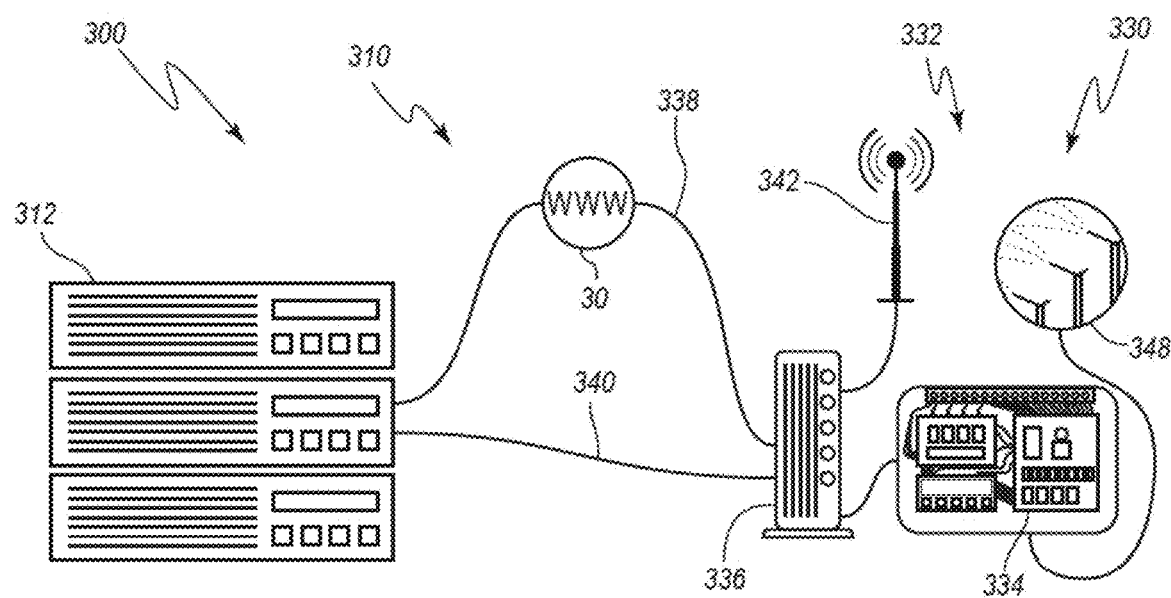
FIG. 3A is a diagram of an INAS similar to the INAS of FIG. 1, with a participant-consumer system.

The communication module may be internal to the irrigation control center 132, or may be an external module (see, e.g., network interface 336 in FIG. 3A). The communication module may provide a network connection 136 to permit communication between the irrigation control center 132 and the INAS network server 112 of the INAS network 110. The irrigation control center 132 may comprise an antenna 138 to facilitate communication with the wireless GMC sensor(s) 142, if deployed, and/or the INAS network server 112 of the INAS network 110.

The irrigation system 148 of the participant-contributor system 130 may be of any type suitable for agricultural irrigation purposes. By way of example without limitation, the irrigation system 148 may be a sprinkler system, an overhead pivot irrigation system, a lateral move irrigation system, a furrow-flood irrigation system, etc. The participant-contributor system 130 may have a plurality of irrigation systems 148 coupled to the irrigation control center 132. Furthermore, each irrigation system 148 of the participant-contributor system 130 may be capable of multiple irrigation discharge rates.

The type of irrigation, timing of irrigation, and duration of irrigation may be considered by the processor 134 when determining an evaporation rate. For example, the processor 134 may determine when irrigation is happening and may discard sensor data during irrigation periods. The sensor data during irrigation would not demonstrate an evaporation rate. Therefore, discarding the sensor data during irrigation would reduce errors when calculating an evaporation rate.

While some embodiments may determine evaporation rate using the processor 134 of the participant-contributor system 130, in some embodiments, the INAS network server 112 may determine the evaporation rate. For example, the INAS network server 112 may receive data (e.g., the GMC sensor data, the irrigation operation data, etc.) from the participant-contributor system 130 and determine a slope of the GMC sensor data to determine an evaporation rate, as further described below.

The irrigation control center 132 may further use each available discharge rate of each irrigation system 148 coupled to the irrigation control center 132 to assess a need to activate one or more of the irrigation systems 148, and, further, may determine which discharge rate to employ, and may also compute an estimated irrigation duration and a minimum deactivation threshold. Once the estimated irrigation duration is reached, the irrigation control center 132 may poll the GMC sensor(s) 140, 142 to ascertain a current GMC, and may then compare the current GMC to the minimum deactivation threshold to ensure that GMC is at or above the minimum deactivation threshold. Once the GMC is at or above the minimum deactivation threshold, the irrigation control center 132 may deactivate the irrigation system 148.

The irrigation control center 132 may also upload GMC data from the GMC sensor(s) 140, 142 to the INAS network server 112 of the INAS network 110. The INAS network server 112 may aggregate GMC data from one or more participant-contributor systems 130. The INAS network server 112 may distribute data to participant-consumer systems 150. The data distributed by the INAS network server 112 may comprise an irrigation need (which may be in a form such as $ET_0$) at various participant-contributor systems, GMC data of various participant-contributor systems, distances between the particular participant-consumer system and the various participant-contributor systems, a calculated $ET_0$ for the particular participant-consumer system, and/or an irrigation schedule for the particular participant-consumer system.

The participant-consumer system 150 comprises an irrigation control center 152 and at least one irrigation system 158. The irrigation control center 152 comprises a processor 154. The irrigation control center 152 may also have a network connection 156. The processor 154 of the irrigation control center 152 may receive weather data from the weather service 10, and data of at least one participant-contributor system 130 from the INAS network server 112 of the INAS network 110. As previously indicated, the data sent to the participant-consumer system 150 may be $ET_0$ and/or GMC data at one or more participant-contributor systems, distances from the participant-consumer system 150 to the various participant-contributor systems, $ET_0$ at the participant-consumer system 150, and/or an irrigation schedule at the participant-consumer system 150 calculated by the INAS network server 112. Additionally, in some embodiments, the data may include a variety of physical characteristics of the participant-contributor systems. The physical characteristics may include one or more of soil type (e.g., sand, loam, clay), soil temperature, air temperature, humidity, crop types, and microclimate (e.g., sun or shade). In some embodiments, the processor 154 may also receive, by an input device or a memory, a plant water uptake rate.

Based on the weather data and data received from the INAS network server 112, the processor 154 of the irrigation control center 152 of the participant-consumer system 150 may compute an evaporation rate for each irrigation system 158 of the participant-consumer system 150. One or more physical characteristics of the participant-consumer site may be compared against the participant-contributor sites. For instance, one or more physical characteristic differences may be used as factors in weighting the evaporation rates from one or more participant-contributor systems. For example, the physical characteristics may include one or more of distance soil type (e.g., sand, loam, clay), soil temperature, air temperature, humidity, crop types, and microclimate (e.g., sun or shade). The more similar the participant-contributor site is to the participant-consumer site, the closer the evaporation rates may be.

Thus, in some embodiments, the evaporation rates from one or more participant-contributor systems may be weighted based on one factor or a combination of factors that are related to physical characteristics of the sites. The factors may include distance from the irrigation system 158. In some embodiments, soil type (e.g., sand, loam, clay), soil temperature, air temperature, humidity, crop types, and microclimate (e.g., sun or shade). The weighted evaporation rates may be averaged.

The average weighted evaporation rate may be an estimated localized evaporation rate. The evaporation rates from participant-contributor systems may be localized to each irrigation system 158 by weighting and averaging the evaporation rates, as discussed below, for each irrigation system 158 of the participant-consumer system 150. The processor 154 may use the evaporation rate and plant water uptake rate to calculate an irrigation demand for each irrigation system 158 associated with the participant-consumer system 150.

Figure 2A:
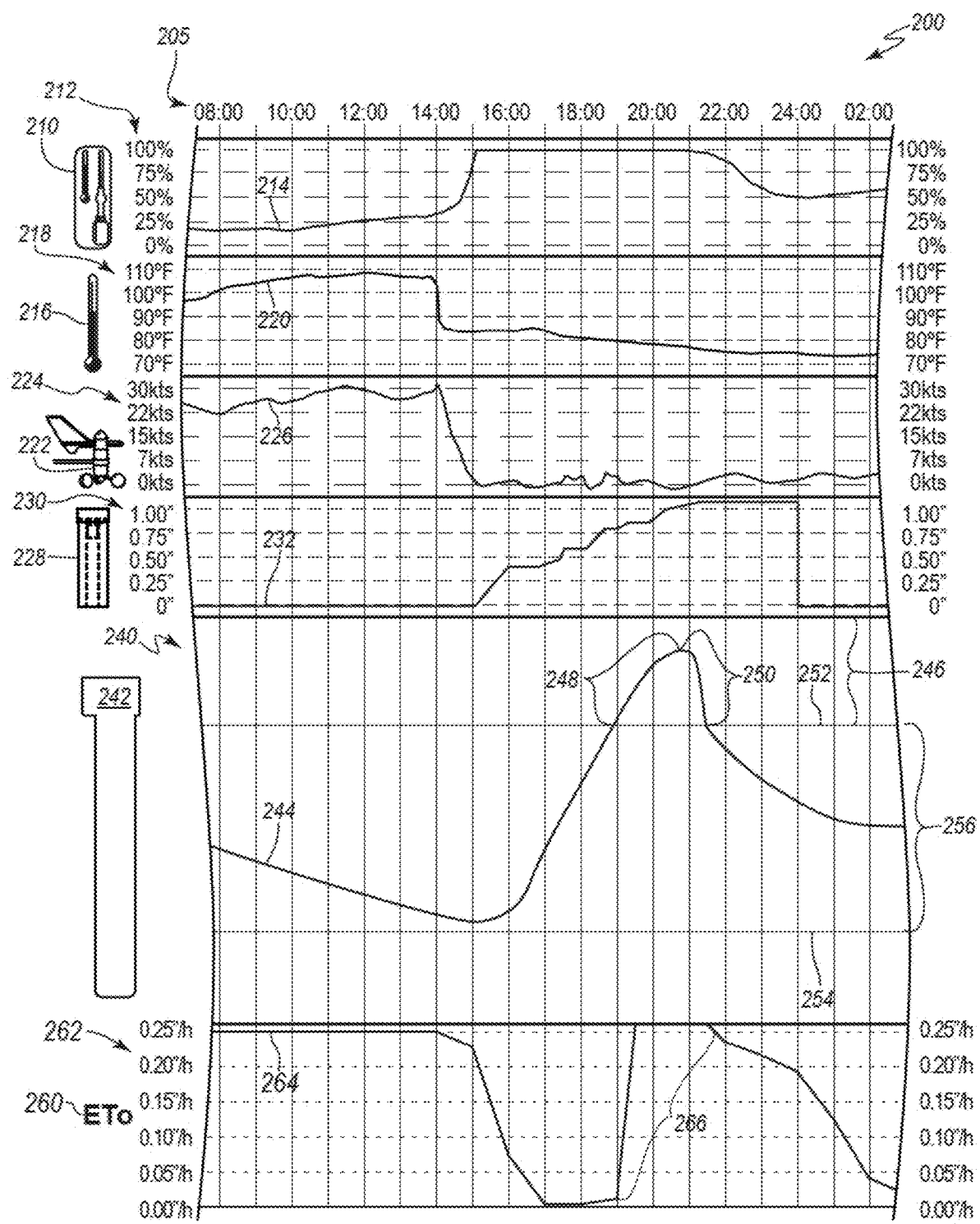
FIG. 2A is an example data series chart for a first hypothetical participant-contributor system ("first participant-contributor system") analogous to the participant-contributor system of FIG. 1, and comprising data from a collection of weather monitoring instruments, a ground moisture content ("GMC") sensor array, and an irrigation need for the first participant-contributor system.

FIG. 2A is an example data series chart 200 for a first hypothetical participant-contributor system ("first participant-contributor system") analogous to the participant-contributor system 130 of FIG. 1. The data series chart 200 comprises data from a collection of weather monitoring instruments, a GMC sensor array 242, and an $ET_0$ 260 for the first participant-contributor system. The data series chart 200 spans a period of several hours, indicated by a time index 205, from before 8:00 AM to after 2:00 AM. The time index 205 is divided into hours, with a label for each two-hour period shown. The times are local to the first participant-contributor system.

A number of weather conditions are reflected in the column to the right and in the upper portion of the data series chart 200. Humidity, tracked by a wet-bulb thermometer 210, is reflected by a humidity curve 214 against a scale 212 of 0% to 100% humidity. Temperature, as reported by a thermometer 216, is reflected by a temperature curve 220 against a scale 218 of 70° to 110° Fahrenheit (analogous to 21° to 43° Celsius). Wind speed, as reported by a wind vane/anemometer 222, is reflected by a wind speed curve 226 against a scale 224 of 0 to 30 knots (analogous to 0 to 35 MPH, and 0 to 15.5 m/sec). Precipitation, as reported by a precipitation gauge 228, is reflected by a precipitation curve 232 against a scale 230 of 0 to 1.00 inch (analogous to 0 to 25 mm). The humidity curve 214, temperature curve 220, and wind speed curve 226 each reflect a recording of instantaneous measurement of the corresponding weather factor. The precipitation curve 232 represents an accumulation of precipitation for a local day, and resets at local midnight.

The center portion of the data series chart 200 reflects GMC as reported by the GMC sensor array 242 and shown by a GMC curve 244 on a GMC chart 240. The GMC chart 240 comprises a field capacity index 252 and a permanent wilting point index 254. Above the field capacity index 252 is a region representing oversaturation 246. Between the field capacity index 252 and the permanent wilting point 254 is a region representing plant available water 256, meaning moisture in the soil which a plant can draw to sustain itself. Any moisture in the soil below the permanent wilting point 254 is generally not available to (cannot be drawn by) a plant.

The lower portion of the data series chart 200 reflects an apparent $ET_0$ 260 shown by a curve 264 against a scale 262 of 0 to 0.25 inch per hour (analogous to 0 to 6.5 mm/hr). The $ET_0$ 260 may be determined using the GMC as reported by the GMC sensor array 242. For example, a derivative of the GMC curve 244 may be used to determine the $ET_0$ 260. The $ET_0$ 260 may be calculated by a scientifically accepted method, such as, e.g., a Penman-Monteith calculation of evapotranspiration. Such calculation may consider, directly or indirectly, weather conditions such as those illustrated in the upper portion of the data series chart 200. The apparent $ET_0$ 260 may include a skewed portion 266. The skewed portion 266 may result from a change in GMC due to something other than evaporation of water. In the present example, the GMC curve 244 reflects a period (248/250) of time during which the ground is oversaturated and water may be draining (flowing away) rather than evaporating. The apparent $ET_0$ 260 does not consider loss of moisture due to water draining, etc. The skewed portion 266 of the $ET_0$ curve may comprise one or more inflection points—an indication of a rapid change in GMC which suggests the change in GMC is not due to evaporation of water. This information can be used, as explained elsewhere herein, to form a more accurate inferred $ET_0$.

With reference to each of the curves 214, 220, 226, 232, 244, and 264, the data series chart 200 reflects a nominally high evaporation rate and rapidly declining GMC in the hours prior to 15:00, along with—and at least influenced by—low humidity, high temperature, high winds, and lack of precipitation. Between 12:00 and 13:00, the GMC curve 244 approaches the permanent wilting point index 254. (While not shown in the present example, continued evaporation may cause the GMC to drop below the permanent wilting point. When the GMC drops sufficiently for the particular soil, evaporation at the site may be reduced or may even cease due to a lack of water which can be separated from the soil to evaporate.) A weather change is reflected between 14:00 and 15:00, representing a weather front passage at approximately 14:00, followed by decreasing winds, rapidly dropping temperature, and increasing humidity. At approximately the same time, and influenced by the concurrent weather conditions, the evaporation rate begins to decrease. At approximately 15:00, the precipitation curve 232 indicates precipitation begins to accumulate, and, concurrently, the evaporation decreases substantially and the GMC curve 244 begins to rise. As the precipitation continues, the GMC curve 244 exceeds the field capacity index 252 at approximately 19:00. Additional precipitation causes an accrual 248 of water above the field capacity of the soil, peaking at approximately 21:00. In a relatively short period, the water above the field capacity of the soil drains 250. During periods of precipitation, the $ET_0$ 260 may be at or near zero; however, if the ground becomes oversaturated, the $ET_0$ 260 may appear to sharply increase because of water draining away from the soil. From approximately 21:30, no further precipitation occurs, as reflected by the flatness of the precipitation curve 232. After precipitation has nominally ceased, and other weather conditions remain mild, the $ET_0$ 260 may decrease and may then remain low. The GMC curve 244 shows a downward trend, indicative of evaporation of water from the soil, and may be influenced by plant water uptake.

Figure 2B:
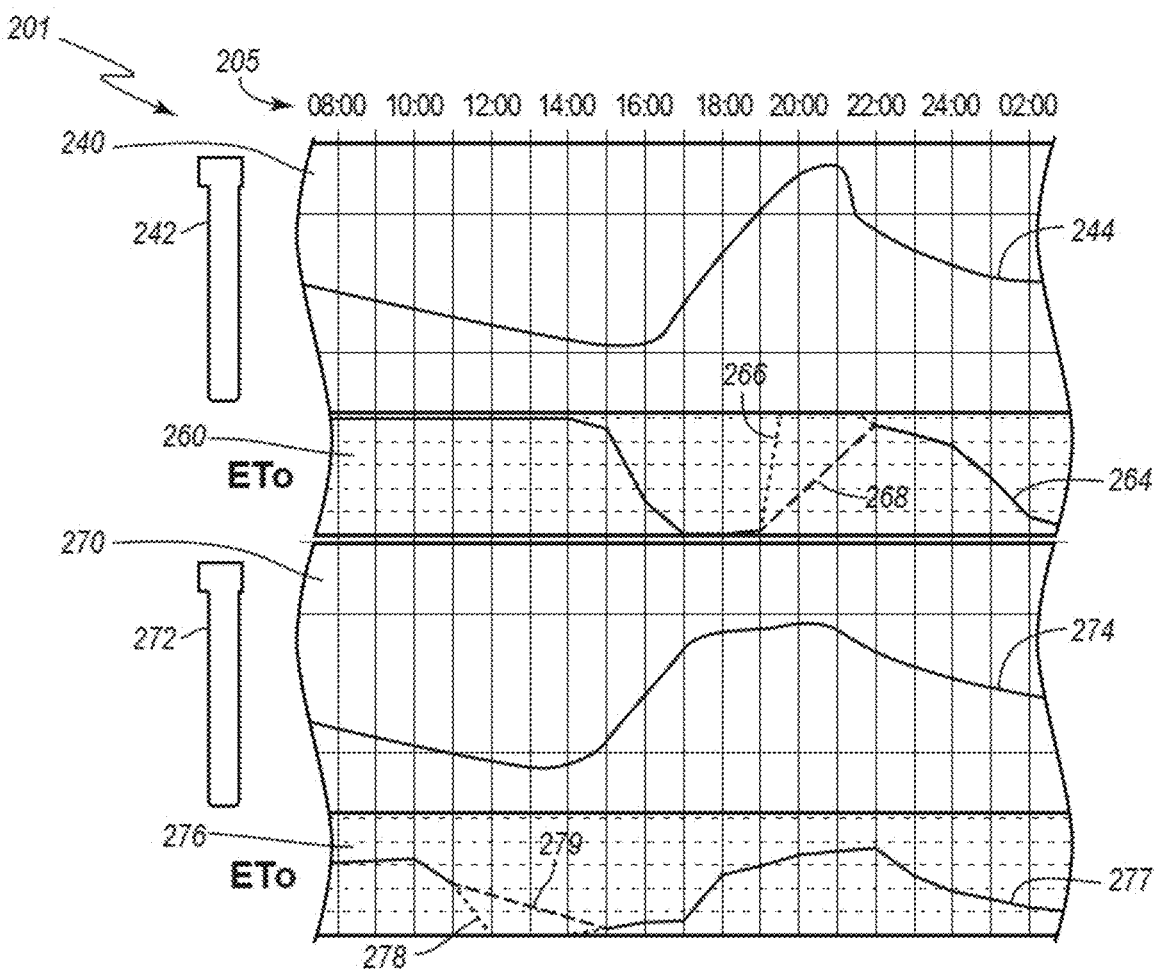
FIG. 2B is a data series chart comprising the GMC chart and irrigation need of the first participant-contributor shown in the data series chart of FIG. 2A, and a GMC chart and an irrigation need at a second hypothetical participant-contributor system ("second participant-contributor system") distinct from the first participant-contributor system.

FIG. 2B is a data series chart 201 comprising the GMC chart 240 and $ET_0$ 260 of the first participant-contributor system shown in the data series chart 200 of FIG. 2A, and a second GMC chart 270 and an $ET_0$ 276 at a second hypothetical participant-contributor system ("second participant-contributor system") distinct from the first participant-contributor system. The time index 205 reflects the same period used in FIG. 2A. The GMC curve 244 and the $ET_0$ curve 264 reflect the GMC curve 244 and $ET_0$ curve 264 of FIG. 2A. The second GMC chart 270 reflects a second GMC curve 274 based on GMC data from a second GMC sensor array 272. Similarly, a second $ET_0$ curve 277 reflects calculation of the $ET_0$ at the second participant-contributor system.

In particular, the $ET_0$ curve 264 reflects the skewed portion 266 described above resulting from oversaturation of the ground and draining away of water. At approximately 18:00, the $ET_0$ curve 264 turns sharply upward, forming an inflection point. A second inflection point may be found at approximately 22:00, when the oversaturation condition has ceased. An inferred $ET_0$ for the period of oversaturation/drainage may be computed by averaging the $ET_0$ at the relevant inflection points, or, as shown, by applying a derivative curve 268 for that period of time based on the average $ET_0$ of the inflection points across the period of time during which the oversaturation condition existed.

Similarly, the GMC curve 274 of the second participant-contributor system reflects the GMC dropping below the permanent wilting point of water and below the area of plant available water. With the GMC below the level of plant available water, $ET_0$ may sharply decline as the remaining water becomes less separable from the soil for evaporation, resulting in a skewed portion 278 of the $ET_0$ curve 277. This sharp reduction in $ET_0$ may produce in the $ET_0$ curve 277 one or more inflection points whereby a derivative curve 279 may be computed as described above. A derivative curve 268, 279 may be useful in computing $ET_0$ for the participant-consumer system site.

Figure 2C:
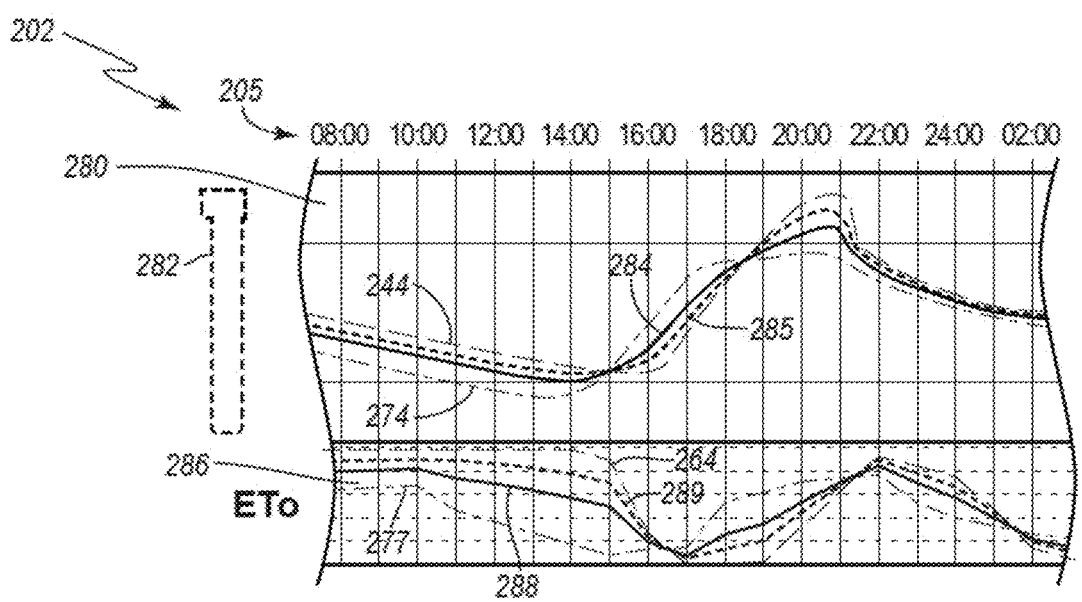
FIG. 2C is a data series chart comprising a GMC chart and an irrigation need chart at a hypothetical participant-consumer system ("participant-consumer system") analogous to the participant-consumer system of FIG. 1.

FIG. 2C is a data series chart 202 comprising a GMC chart 280 and an $ET_0$ chart 286 at a hypothetical participant-consumer system analogous to the participant-consumer system 150 of FIG. 1. The data series chart 202 includes the same time index 205 as shown in FIGS. 2A and 2B.

The GMC curves 244, 274 of the first and second participant-contributor systems are shown on the GMC chart 280. GMC at the participant-consumer system may be imputed from the GMC curves 244, 274 and is reflected in the GMC chart 280 by the imputed GMC curve 284. According to one embodiment, GMC of the participant-consumer system may be an average of the GMC at the participant-contributor systems. In this particular embodiment, the imputed GMC curve 284 is the average, or approximate average, of the GMC curves 244, 274.

In one embodiment, calculation of imputed GMC at the participant-consumer system may include weighting based on one or more factors, such as, e.g., distance from the participant-consumer system, soil type (e.g., sand, loam, clay), soil temperature, air temperature, humidity, crop types, microclimate (e.g., sun or shade), and differences in weather between the participant-consumer system and the participant-contributor system. Calculation of the GMC at the participant-consumer system may be biased toward the GMC of that participant-contributor system which is nearer the participant-consumer system. The degree of distance bias may be influenced by the degree of disparity in the distances of the two participant-contributor systems from the participant-consumer system or other differences in physical characteristics. For the purpose of the present example, the first participant-contributor system is nearer the participant-consumer system than is the second participant-contributor system. The distance differences, as well as other applicable factors, such as, e.g., soil similarity, soil temperature, air temperature, humidity, crop type, microclimate (e.g., sun or shade), elevation, weather pattern track, historical convergence, etc., may be used individually or combined to produce a bias in favor of the first participant-contributor system's GMC with regard to the GMC of the participant-consumer system. This bias, or weighting, may produce an imputed GMC curve 285 for the participant-consumer system.

The $ET_0$ chart 286 for the participant-consumer system similarly includes the $ET_0$ curves 264, 277 of the first and second participant-contributor systems. The $ET_0$ at the participant-consumer system may be imputed from $ET_0$ at each of the participant-contributor systems. In one embodiment, the $ET_0$ at the participant-consumer system may be an average of the $ET_0$ at the first and second participant-contributor systems. Such an embodiment is reflected in an $ET_0$ curve 288 based on averaging the $ET_0$ curves 264, 277. In one embodiment, the $ET_0$ at the participant-consumer system may be derived by averaging a result of a weighting calculation wherein a bias is introduced in favor of the $ET_0$ curve of that participant-contributor system which is nearer the participant-consumer system or is, in pertinent ways, more like the participant-consumer system. In one embodiment, the $ET_0$ at the participant-consumer system may be derived by application of scientifically accepted formulations, such as, e.g., a Penman-Monteith equation, wherein various factors for the equation are derived or imputed from the $ET_0$ at the participant-contributor systems. A weighted $ET_0$ curve 289 is shown on the $ET_0$ chart 286 which may derive from either of the weighting methods described herein, or from another scientifically sound method.

The calculations described above may be performed by a processor at the participant-consumer system, by a processor at an INAS network server (such as the INAS network server 112 of FIG. 1), by a processor at a participant-contributor system, or by a combination of these.

FIG. 3A is a diagram of an irrigation needs assessment service ("INAS") 300 similar to the INAS 100 of FIG. 1, with a participant-consumer system 330. The INAS network server 312 of an INAS network 310 are shown for reference. The participant-consumer system 330 comprises an irrigation control center 332 which, in many respects, is similar to the irrigation control center 152 of FIG. 1. A processor 334 and an irrigation system 348 are shown for reference. In the embodiment of FIG. 3A, the irrigation control center 332 comprises an external network interface 336. The external network interface 336 may permit communication with the INAS network server 312 of the INAS network 310 through one or more of: a direct-cabled connection 340, a connection 338 to and through an Internet 30, and a wireless connection 342. A wireless connection 342 of the external network interface 336 may be configured to connect wirelessly or via the Internet 30 to the INAS network 310.

Figure 3B:
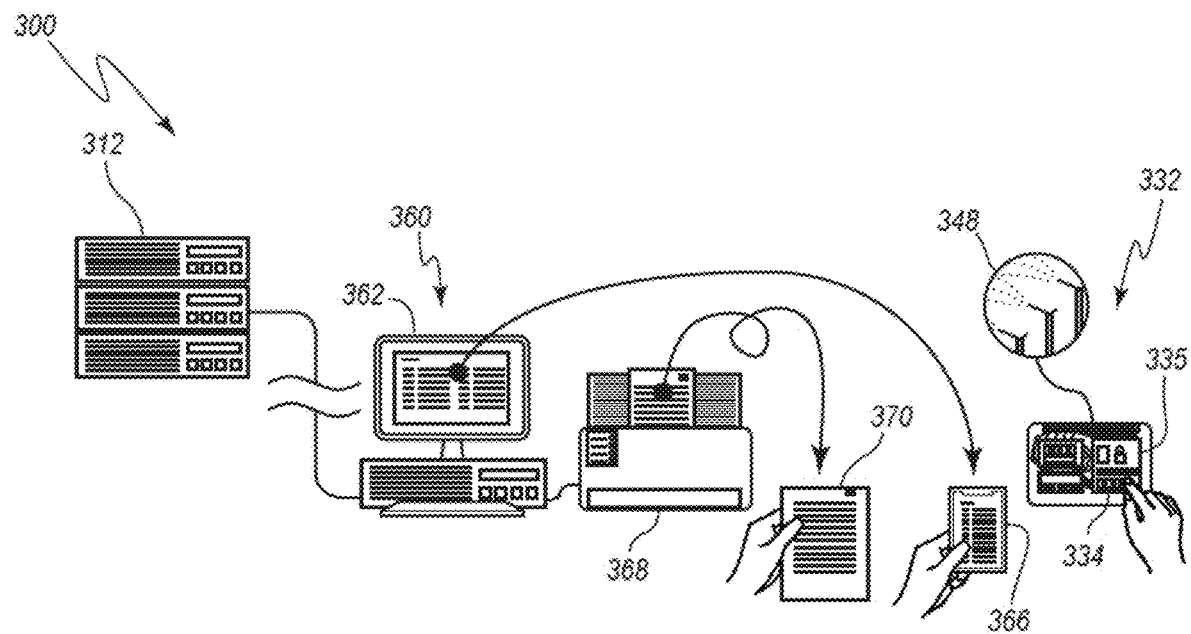
FIG. 3B is a diagram of an alternate embodiment of the participant-consumer system of FIG. 3A.

FIG. 3B is a diagram of an alternate embodiment of the participant-consumer system 330 of FIG. 3A. A computer 360 is shown, comprising a display 362 and a printer 368. The computer 360 further comprises a processor and a data storage device. In one embodiment, data may be delivered by the INAS network server 312 to the computer 360 to enable the computer 360 to compute an inferred GMC and $ET_0$, and to derive therefrom an irrigation schedule. In one embodiment, such computations may be performed by the INAS network server 312 of the INAS 300, and delivered to the computer 360. The computations performed by the INAS network server 312 may be configured to provide output in various forms useable by the computer 360. The computer 360 may receive the output of the computations performed by the INAS network server 312 and may store the output to the data storage device. The computer 360 may render the output to the display 362 in a human-readable format. A user may interact with the computer 360 to cause the computer 360 to transfer the output to a mobile device 366. The mobile device 366 may be, for example, a mobile phone or a tablet computer, or similar device capable of rendering to a display the output in a human-readable format. The user may cause the computer 360 to, by the printer 368, print the output in a human-readable format to paper 370. The user may, reading the output in human-readable format, interact with the processor 334 by an input device 335 to enter into the irrigation control center 332 instructions to allow or cause the irrigation control center 332 to activate, deactivate, and otherwise operate the irrigation system(s) 348 based on the output from the INAS network server 312.

Figure 4:
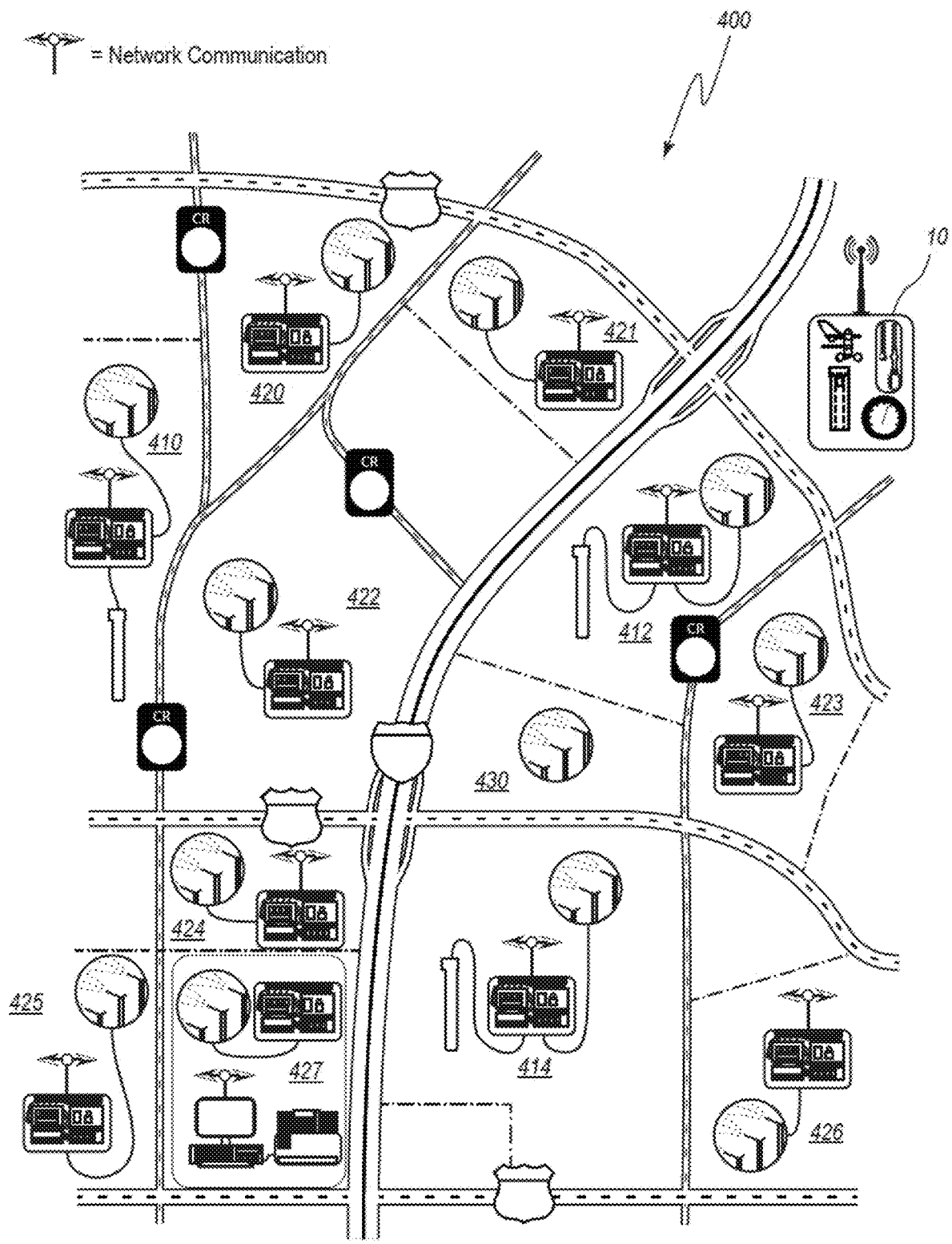
FIG. 4 is a map of a hypothetical agricultural region having an INAS network comprised of INAS participant-contributor systems and INAS participant-consumer systems.

FIG. 4 is a map of a hypothetical irrigation region having an INAS network 400 comprised of INAS participant-contributor systems 410, 412, 414 (collectively, "41x") and INAS participant-consumer systems 420 to 427 inclusive (collectively, "42x"), and site 430 not participating in an INAS. Each INAS participant-contributor system 41x comprises one or more GMC sensors. Each INAS participant-contributor system 41x may collect and employ its own GMC data, and may also share its GMC data with an INAS network server.

The GMC data may be used by each INAS participant-consumer system 42x to determine irrigation needs at the site of the particular INAS participant-consumer system 42x. In some embodiments, an INAS network server may aggregate GMC sensor data from INAS participant-contributor systems 410, 412, 414 (generally or collectively participant-contributor systems 41x), and perform computations (as described elsewhere herein) to determine imputed GMC and/or imputed $ET_0$ at one or more INAS participant-consumer systems 422, 423, 424, 425, 426, 427 (individually or collectively "participant-consumer systems 42x"). The INAS network server may send to each participant-consumer system 42x the imputed GMC and/or $ET_0$ for the particular INAS participant-consumer system 42x. Each participant-consumer system 42x may then employ the imputed GMC and/or imputed $ET_0$ to determine an irrigation schedule for each irrigation system associated with the particular participant-consumer system 42x. In one embodiment, the INAS network server may determine an irrigation schedule for the particular participant-consumer system 42x based on one or more factors including but not limited to the imputed GMC and/or imputed $ET_0$ for a particular participant-consumer system 42x, along with other relevant data, such as, e.g., crop type, crop maturation, irrigation system details (e.g., a delivery capacity of a participant-contributor system 41x, a delivery capacity of a participant-consumer system 42x), etc. The INAS network server may deliver the irrigation schedule to the particular participant-consumer system 42x at regular intervals, upon request from the particular participant-consumer system 42x, etc.

In one embodiment, the various participant-contributor systems 41x and participant-consumer systems 42x may be used to determine imputed GMC and/or imputed $ET_0$ for a site. For example, a participant-contributor system, e.g., the participant-contributor system 412, may download GMC data from other INAS participant-contributor systems 41x from the INAS network server and may perform computations for delivery of GMC data and/or $ET_0$ at a participating-consumer system, e.g., the participant-consumer system 423, as described elsewhere herein. The participant-contributor system 412 may deliver the resulting data to the participating-consumer system 423, or may upload the resulting data to the INAS network server, and the participating-consumer system 423 may then download the resulting data from the INAS network server.

Each INAS participant-consumer system 42x may operate more efficiently than the site 430 not participating in an INAS. For example, each INAS participant-consumer system 42x may use an imputed $ET_0$ based on sensor measurements from the participant-contributor systems 41x and a relationship between one or more physical characters between the sites such as distance, soil type, soil temperature, air temperature, humidity crop type, and microclimate differences to more accurately determine when irrigation should occur. In contrast, the site 430 not participating in an INAS would rely on a schedule that does not consider the $ET_0$. The site 430 not participating in an INAS may over water or under water without this information.

Figure 5:
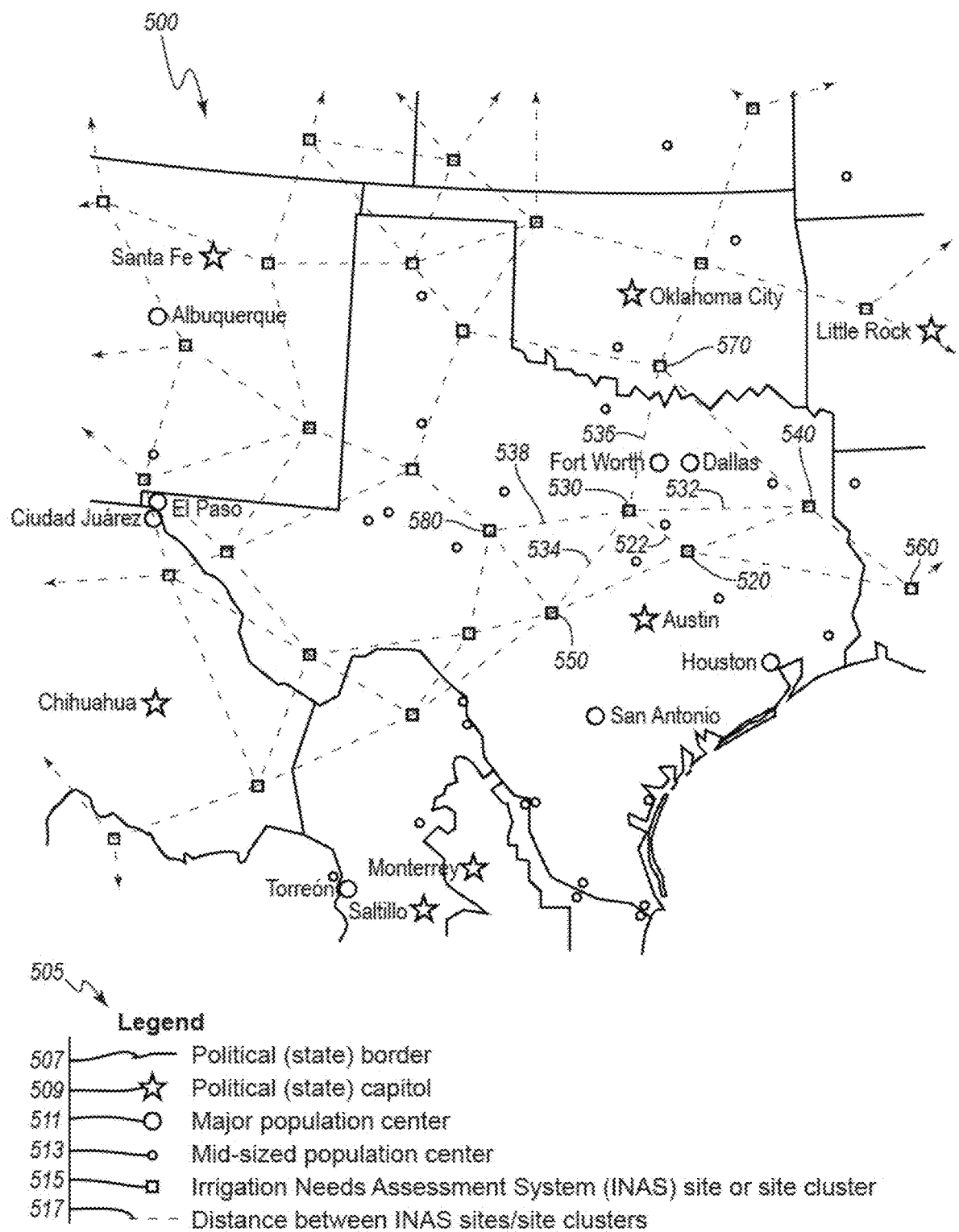
FIG. 5 is a wide-area map reflecting a plurality of INAS sites, the INAS sites including at least participant-contributor systems, participant-consumer systems, and INAS sites having both participating-contributor and participant-consumer systems.

FIG. 5 is a wide area map 500 reflecting a plurality of INAS sites, the INAS sites including at least participant-contributor systems 520, 580, participant-consumer systems 530, 560, and INAS sites having both participating-contributor and participant-consumer systems 540, 550, 570. For reference a legend 505 indicates symbols used to represent political (state and national) borders 507, political (state) capitols 509, major population centers 511, mid-sized population centers 513, INAS participant system sites 515, and distances between INAS participant system sites 517. State capitols, as well as major population centers, are labeled by name for reference. Each INAS site may have a plurality of participant systems. Furthermore, each INAS site having a plurality of participant systems may be comprised of both participant-contributor systems and participant-consumer systems.

In one embodiment, the participant-contributor system 520 may send GMC data and/or $ET_0$ data to a number of participant-consumer systems, including at least the participant-consumer system 530, and may further include the participant-consumer system 560, and participant-consumer systems at INAS sites 540 and 550. In one embodiment, the participant-contributor system 520 may upload GMC and/or $ET_0$ data to an INAS network server. The INAS network server may provide the GMC and/or $ET_0$ data of the participant-contributor system 520 to participant-consumer systems 530, 560, as well as the participant-consumer systems at INAS sites 540, 550, at regular intervals or on request.

In one embodiment, the participant-consumer system 530 may receive GMC data from a plurality of participant-contributor systems, such as the participant-contributor systems 520, 580, and the participant-contributor systems as the INAS sites 540, 550, 570, directly or via the INAS network server. The participant-consumer system 530 may compute an imputed GMC at the participant-consumer system 530 based on the GMC data provided by the other participant-contributor systems 520, 540, 550, 570, 580, weighted based on a relationship between one or more physical characteristics of the systems such as distance, soil type, soil temperature, air temperature, humidity, crop type, and microclimate differences. The imputed GMC for the participant-consumer system 530 may be computed as described elsewhere herein, and may include relevant bias calculation, also described elsewhere herein. For example, the distances between the participant-consumer system 530 and each of the participant-contributor systems 520, 540, 550, 570, 580 are shown at, respectively, 522, 532, 534, 536, and 538. The difference in the distances 522, 532, 534, 536, 538 may be one factor which may be used to provide a weighting when calculating the imputed GMC for the participant-consumer system 530. Other factors may include, soil type, soil temperature, air temperature, humidity crop type, and microclimate differences. The participant-consumer system 530 may also calculate an imputed $ET_0$ based on the imputed GMC calculation. Relevant bias factors may also be used in calculating the imputed $ET_0$ at the participant-consumer system 530. The participant-consumer system 530 may further derive an irrigation schedule for each irrigation system associated with the participant-consumer system 530.

In one embodiment, the participant-consumer system 530 may receive $ET_0$ data from a plurality of participant-contributor systems, such as the participant-contributor systems 520, 540, 550, 570, 580, directly or via the INAS network server. The participant-consumer system 530 may compute an imputed $ET_0$ at the participant-consumer system 530 based on the $ET_0$ data provided by the participant-contributor systems 520, 540, 550, 570, 580. The imputed $ET_0$ for the participant-consumer system 530 may be computed as described elsewhere herein, and may include relevant bias calculation, also described elsewhere herein. The participant-consumer system 530 may derive an irrigation schedule for each irrigation system associated with the participant-consumer system 530.

In one embodiment, the INAS network server may calculate the imputed GMC and/or imputed $ET_0$ at the participant-consumer system 530, and deliver this information to the participant-consumer system 530 at regular intervals or on request. The participant-consumer system 530 may, from the imputed GMC and/or imputed $ET_0$, derive an irrigation schedule for each associated irrigation system. In one embodiment, the INAS network server may derive an irrigation schedule for each irrigation system associated with the participant-consumer system 530, and deliver the irrigation schedule to the participant-consumer system 530 for implementation.

While the foregoing example involves participant-contributor systems 520, 540, 550, 570, 580 which may appear to be near-neighbors of the participant-consumer system 530, this is for convenience of the disclosure and should not be construed as a limitation of the disclosure. For example, an imputed $ET_0$, and an irrigation schedule for the participant-consumer system 560, may be derived with data from nearby participant-contributor systems 520, 540, and data from the more distant participant-contributor system 580, wherein bias factors, due to, for example, distance variations, soil type, soil temperature, air temperature, humidity crop type, and microclimate differences, may produce greater weighting in favor of the data of the participant-contributor system 540 over the data of the participant-contributor system 580.

Figure 6:
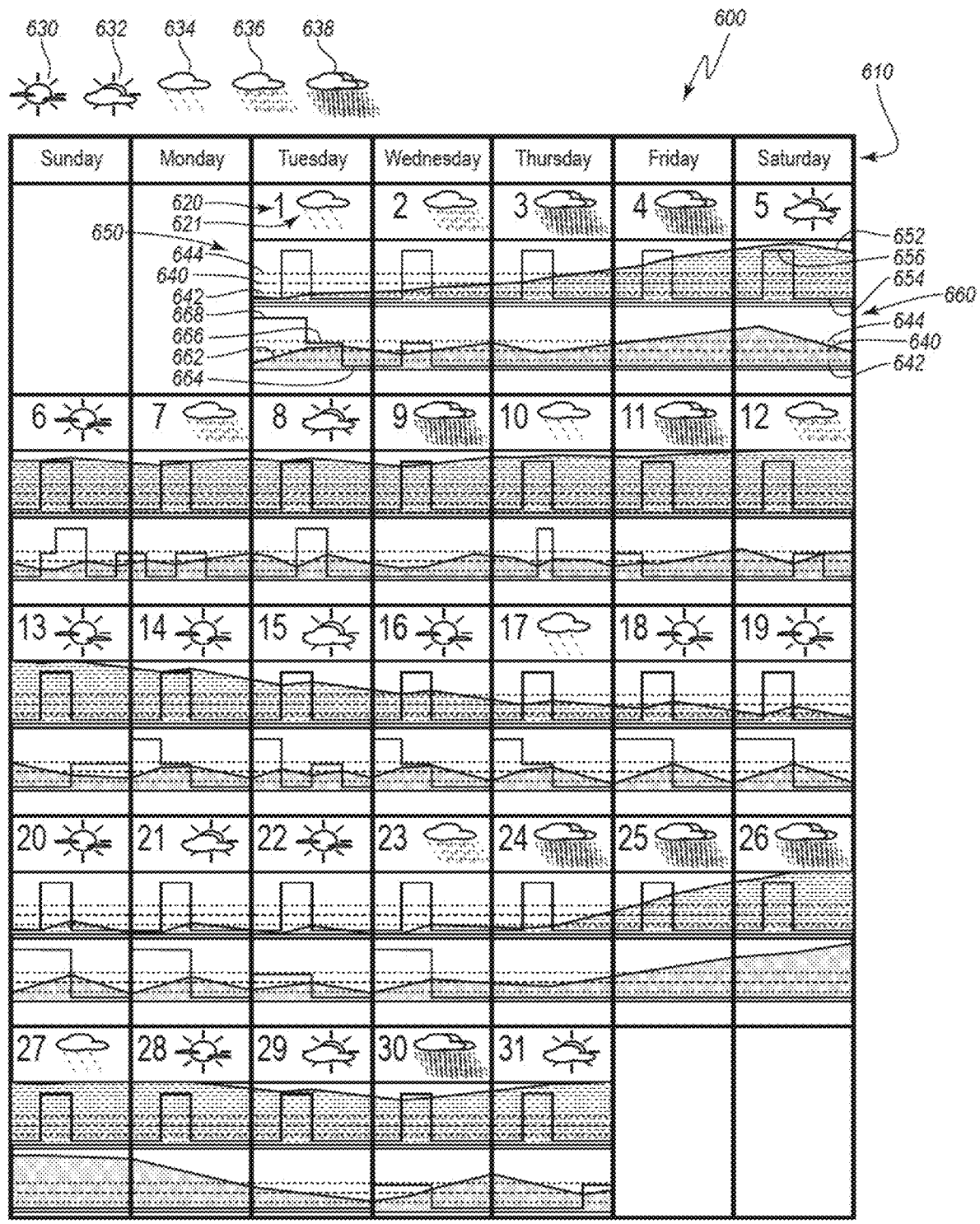
FIG. 6 is an illustration of a hypothetical month calendar representing weather conditions and GMC at irrigation sites of hypothetical INAS participants and non-participants.

FIG. 6 is an illustration of a hypothetical month calendar 600 representing weather conditions and GMC at irrigation sites of hypothetical INAS participants and non-participants. The calendar 600 is presented in a traditional week-wise format. Days 610 are represented across the top of the calendar 600, with dates (1-31) 620 of particular days indicated within each representation of a day. A non-INAS participant graph 650 and an INAS participant graph 660 are represented for the duration of the calendar 600. General weather conditions 621 for each date (1-31) 620 are indicated, with "mostly sunny" represented by an icon 630, "mostly cloudy" represented by an icon 632, "showers" represented by an icon 634, "rainy" represented by an icon 636, and "heavy rain" represented by an icon 638. The weather conditions of the icons 630-638 are merely generalizations for the purposes of an example, and are not limiting in any way. A weather icon 630-638 is rendered for each date (1-31) 620 to indicate a predominant weather condition 621 for the particular date (1-31) 620.

The non-INAS participant graph 650 includes a nominally ideal GMC level 640, a −50% GMC level 642 (50% below the nominally ideal GMC level 640), a +50% GMC level 644 (50% above the nominally ideal GMC level 640), a GMC curve 652, an "irrigation off" indicator 654, and an "irrigation on" indicator 656. The non-INAS participant graph 650 represents a non-INAS participant, such as the non-INAS participant 430 of FIG. 4. More particularly, the non-INAS participant graph represents a non-INAS participant having a fixed irrigation schedule such that irrigation is activated at a fixed particular time each day, and deactivated at another fixed particular time each day.

The INAS participant graph 660 includes the nominally ideal GMC level 640, the −50% GMC level 642, the +50% GMC level 644, a GMC curve 662, an "irrigation off" indicator 664, an "irrigation on low" indicator 666, and an "irrigation on high" indicator 668. The INAS participant graph 660 represents an INAS participant system, such as an INAS participant-contributor system 41x or INAS participant-consumer system 42x of FIG. 4. Furthermore, the INAS participant graph 660 represents an INAS participant system having an irrigation system with a configurable discharge rate of irrigation, such that the irrigation system may be activated at a lower discharge rate ("irrigation on low" 666) or at a higher discharge rate ("irrigation on high" 668).

The two graphs 650, 660 may be viewed as representing two adjacent farms, such as, by way of example, the INAS participant-contributor system 412 and the non-INAS participant site 430 of FIG. 4. For the present example, the INAS participant-contributor system and the non-INAS participant each irrigates a 40 acre (quarter-quarter section) of land. More particularly, the two graphs 650, 660 represent land comprising the same geophysical makeup (material, topology, drainage, etc.) and subject to identical weather. In other words, for the present example, the sole appreciable distinction between the non-INAS participant graph 650 and the INAS participant graph 660 is that one participates in an INAS and has a configurable discharge rate irrigation system operated under direction of an INAS irrigation control center, analogous to the irrigation control center 132 of FIG. 1, and the other does not participate in an INAS and uses a fixed irrigation schedule.

The non-INAS participant graph 650 indicates that the GMC, as reflected by the GMC curve 652, deviates substantially from the nominally ideal GMC level 640. Conversely, the GMC curve 662 of the INAS participant graph 660 indicates less deviation (in frequency and magnitude) of the GMC from the nominally ideal GMC level 640. More particularly, the non-INAS participant graph 650 shows irrigation occurring on each of the 31 dates of the calendar 600, while the INAS participant graph 660 shows irrigation occurring on 21 dates. Furthermore, the non-INAS participant graph 650 indicates that the GMC curve 652 was at or below the −50% GMC level 642 for approximately 100 hours, while the INAS participant graph 660 shows the GMC curve 662 at or below the −50% GMC level 642 for approximately 14 hours. Similarly, the GMC curve 652 of the non-INAS participant graph 650 is at or above the +50% GMC level 644 for approximately 476 hours, and the GMC curve 662 of the INAS participant graph 660 is at or above the +50% GMC level for approximately 138 hours. Notably, the GMC curve 652 of the non-INAS participant graph 650 is more than 100% above the nominally ideal GMC level 640 for approximately 422 hours, while the GMC curve 662 of the INAS participant graph 660 is more than 100% above the nominally ideal GMC level 640 for approximately 75 hours.

The following distinctions with regard to water consumption between the non-INAS participant graph 650 and the INAS participant graph 660 are observable from the calendar 600:

| Observation | Non-INAS participant | INAS participant |
|---|---|---|
| Number of dates irrigated | 31 | 21 |
| Hours below 50% of nominally ideal GMC | ~100 | ~14 |
| Hours more than 50% above nominally ideal GMC | ~476 | ~138 |
| Hours more than 100% above nominally ideal GMC | ~422 | ~76 |
| Hours at 0.5"/hr irrigation | 124 | 70 |
| Hours at 0.2"/hr irrigation | n/a | 74 |
| On 40 acres (1 quarter-quarter section) | | |
| Water consumption (gallons) | 1,683,562 | 1,352,282 |
| Water savings (gallons (acre-feet)) | n/a | 331,280 (1.02) |
| Daily residential saving equivalent (persons)[1] | | 130 |
| On 160 acres (1 quarter section) | | |
| Water consumption (gallons) | 6,734,248 | 5,409,128 |
| Water saving (gallons (acre-feet)) | n/a | 1,325,120 (4.07) |
| Daily residential saving equivalent (persons)[1] | | 519 |
| On 640 acres (1 section) | | |
| Water consumption (gallons) | 26,936,992 | 21,636,512 |
| Water savings (gallons (acre-feet)) | n/a | 5,300,480 (16.27) |
| Daily residential saving equivalent (persons)[1] | | 2,077 |

[1] Average per capita domestic water consumption in 2015 was 82.33 gallons per person daily. Accord: https://water.usgs.gov/watuse/wupo.html, last accessed Mar. 18, 2018.

The foregoing table is an example of theoretical water consumption and savings and not a limitation of the present disclosure.

Figure 7:
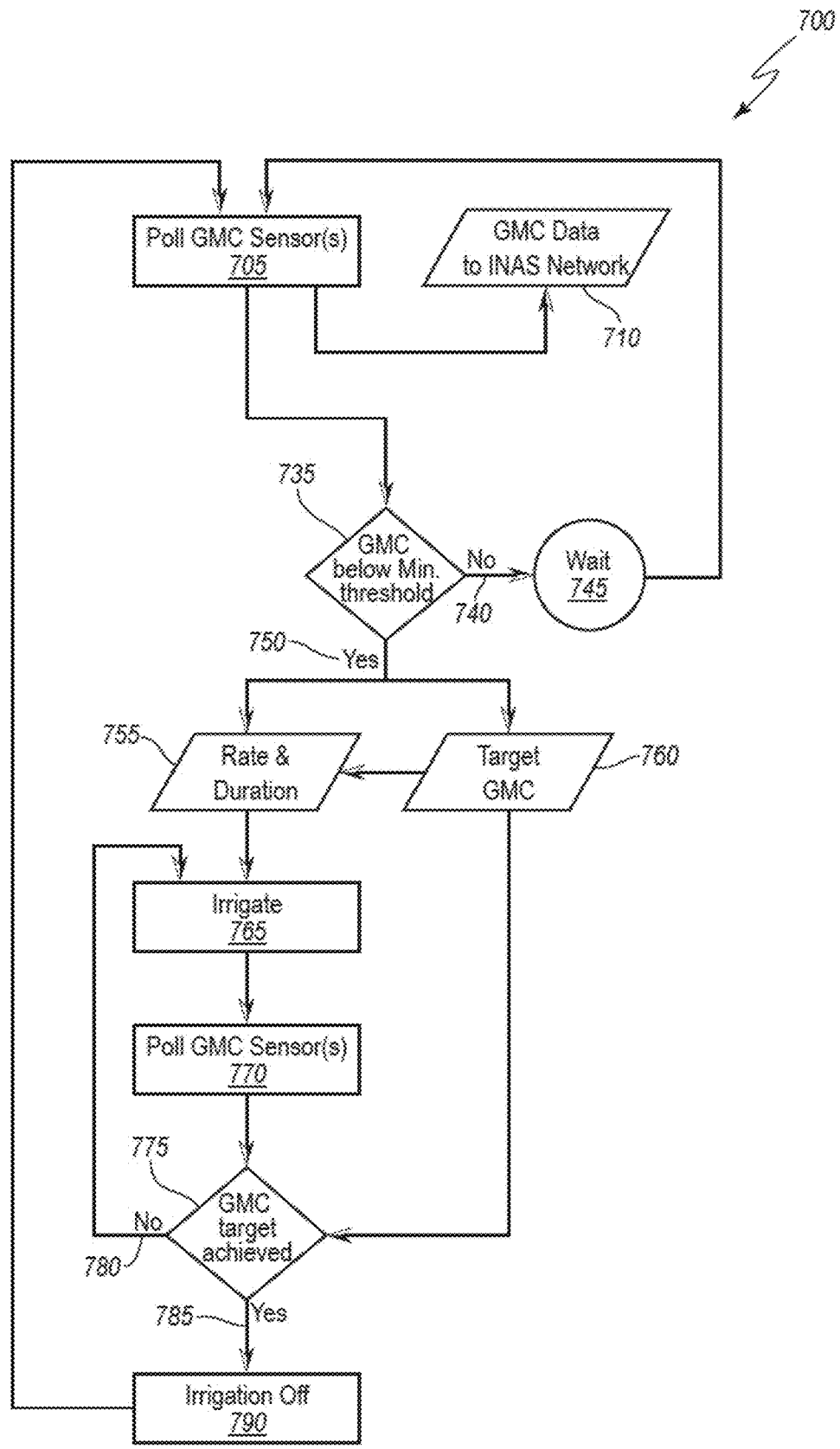
FIG. 7 is a flowchart of a method for irrigation needs assessment as may be utilized by an INAS participant-contributor system, such as the participant-contributor system of FIG. 1.

FIG. 7 is a flowchart 700 of a method for irrigation needs assessment as may be utilized by an INAS participant-contributor system, such as the participant-contributor system 130 of FIG. 1. The GMC sensors of the participant-contributor system may be polled 705 to obtain current GMC data. The polling 705 of the GMC sensors may occur at a configurable time interval. The GMC data may be shared, or uploaded 710 to an INAS network. The GMC data may be uploaded to an INAS network server or, alternatively, shared directly with an INAS participant-consumer system. In one embodiment, current (or latest) weather data may be requested from a weather service. Polling 705 of the GMC sensors (as well as uploading 710 the GMC data) and requesting the weather data may occur in parallel and may occur synchronously or asynchronously. Based on a variety of factors, such as, e.g., crop variety, crop maturity, weather forecast for a configurable period of time, etc., a minimum GMC threshold may be established by a processor of the participant-contributor system. The current GMC is compared 735 to the minimum GMC threshold. If the current GMC is above the minimum GMC threshold 740, a waiting period 745 may be entered, after which the GMC sensors are polled 705 anew. Weather data may also be requested and received after the waiting period.

In one embodiment, if the current GMC is at or below the minimum GMC threshold 750, the participant-contributor system may identify a target GMC 760 and, further, may determine 755 an irrigation duration based on factors, such as, for example, the target GMC 760, soil type, plant water uptake rate, weather forecast, etc. When a variable rate irrigation system is present, a rate of irrigation may be selected in a similar manner. A target GMC 760 for deactivating an irrigation system may similarly be determined. Irrigation may commence 765 for the established duration and, if variable rate irrigation is available, at the selected rate of irrigation. In one embodiment, the duration may be a preconfigured period of irrigation. At the end of the irrigation period, or at a configurable interval, the GMC sensors may be polled 770. The current GMC is compared 775 to the target GMC 760. If the target GMC 760 has not been achieved 780, irrigation may continue for a configurable or preconfigured duration, after which the GMC sensors are again polled 770. This process may repeat until the target GMC 760 is achieved 785, at which point the irrigation system may be deactivated 790. The process then resumes with periodic polling of the GMC sensors 705. In one embodiment, the processor may perform a calculation of an $ET_0$ as part of establishing an irrigation duration 755.

Figure 8:
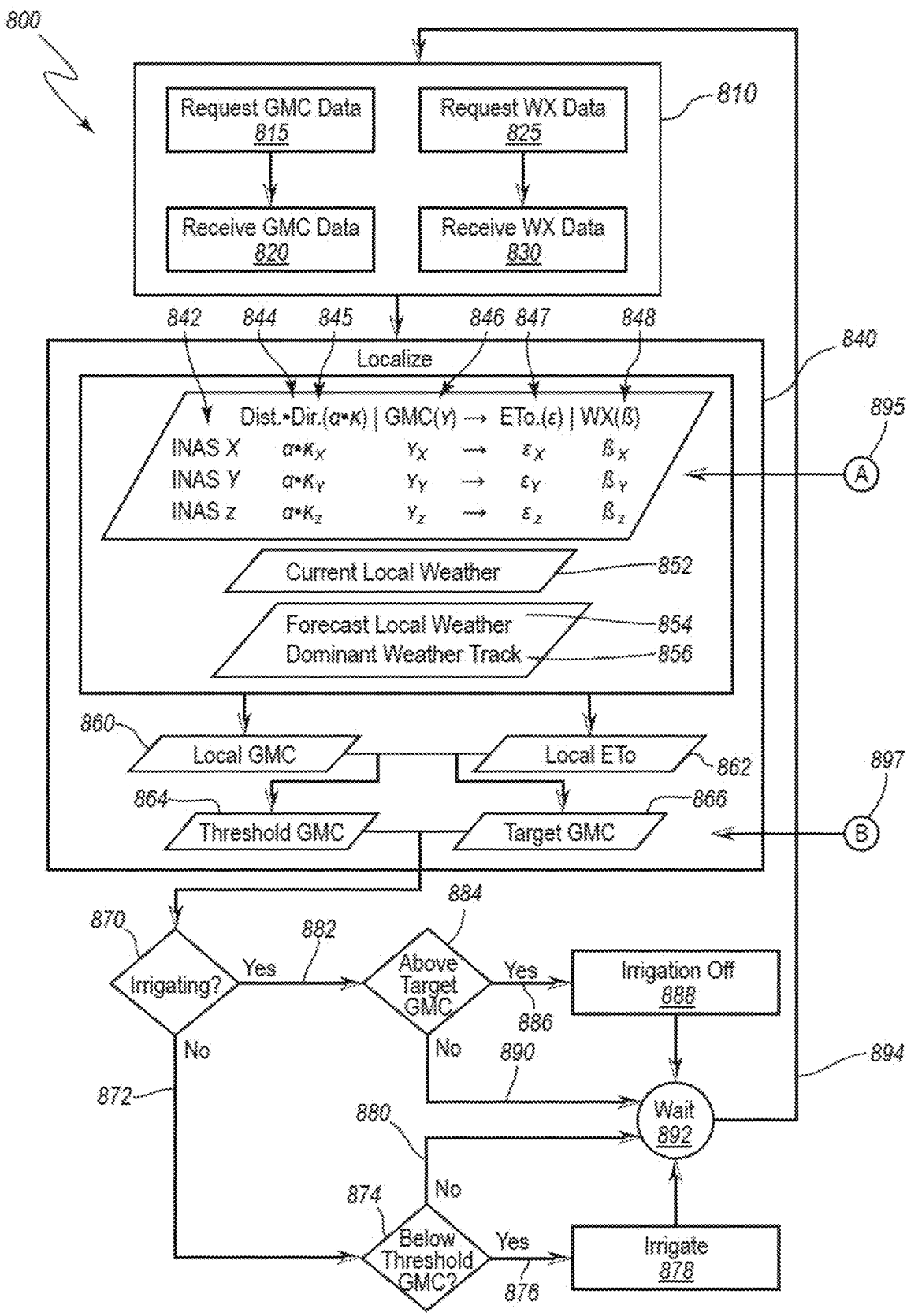
FIG. 8 is a flowchart of a method for irrigation needs assessment as may be utilized by an INAS participant-consumer system, such as the participant-consumer system of FIG. 1.

FIG. 8 is a flowchart 800 of a method for irrigation needs assessment as may be utilized by an INAS participant-consumer system, such as the participant-consumer system 150 of FIG. 1. One or more participant-contributor systems associated with the particular INAS of the participant-consumer system may upload to an INAS network server GMC data (see, e.g., upload GMC data 710 in FIG. 7). The participant-consumer system may both request and receive 810 information pertinent to computing GMC and/or $ET_0$. In various embodiments, the participant-consumer system may request 815 and receive 820 GMC and/or $ET_0$ data directly from one or more participant-contributor systems, request 815 and receive 820 GMC and/or $ET_0$ data from an INAS network server, or a combination of these. The participant-consumer system may request 825 and receive 830 weather information directly from a weather service, from an INAS network server, or both. In one embodiment, GMC and/or $ET_0$ data may include technology understood in the area of computer sciences to mask, obscure, or otherwise anonymize the identity of a participant-contributor system. For example, when a participant-contributor system sends information to an INAS network server, the INAS network server may employ a one-way hashing algorithm to create a pseudonymic identifier for the participant-contributor system. If the INAS network server subsequently sends the GMC and/or $ET_0$ of the particular participant-contributor system to a participant-consumer system, the pseudonymic identifier may be sent along with the GMC and/or $ET_0$ data. Such anonymization may protect the privacy interests of the particular participant-contributor system while still creating an audit trail for the INAS network.

The participant-consumer system may request 815 and receive 820 current or latest GMC data from the INAS network server. In some instances, the GMC data may be augmented or supplanted by $ET_0$ data and may include location data. The participant-consumer system may also request 825 and receive 830 current or latest weather information from a weather service. The requesting and receiving 810 of GMC and weather data may occur in parallel and, hence, may occur synchronously or asynchronously.

The GMC/$ET_0$ data received 820 via the INAS network server may be localized 840 to the particular participant-consumer system. Localization 840 may be a calculation or series of calculations performed by a processer of the participant-consumer system (or, in some embodiments, by the INAS network server), taking as input various data regarding GMC and/or $ET_0$ provided from a plurality of participant-contributor systems and taking into account factors which may include differences between current local weather 852 and weather 848 at each participant-contributor system, weather forecast 854, weather pattern or dominant track 856, soil type, soil temperature, air temperature, humidity, terrain, crop differences, distance 844 and direction 845 between the particular participant-consumer system and each participant-contributor system, etc., and generating as output an inferred local GMC 860 and/or an inferred local $ET_0$ 862 for the particular participant-consumer system. More particularly, the participant-consumer system may receive, for a plurality of participant-contributor systems, an identifier (which may be pseudonymic) 842 for each contributing participant-contributor system, a distance 844 and direction 845 for each contributing participant-contributor system, GMC data 846, participant-contributor system $ET_0$ data 847, and information regarding weather 848 at each contributing participant-contributor system at the time of the other associated data. For the present disclosure, it is not requisite that the participant-consumer system receive both the GMC data and $ET_0$ data for each participant-contributor system. Localization may be achieved through use of either GMC data or $ET_0$ data. Thus, the participant-consumer system may receive GMC data 846 from some contributing participant-contributor systems, and $ET_0$ data from other participant-contributor systems and still complete a set of localization calculations. The localization calculations may identify an inferred GMC 860 and inferred $ET_0$ 862 local to the participant-consumer system. Furthermore, the localization calculations may identify a threshold GMC 864 and a target GMC 866.

The threshold GMC 864 may be identified through calculations taking as input factors such as those above, with particular consideration for the soil type, crop and crop maturation, the inferred $ET_0$ and other factors which are informative of the current GMC and a GMC trend as discussed above at FIGS. 2A-2C. More clearly stated, the threshold GMC 864 is a floor below which irrigation is needed to properly support the crop borne by the land of the particular participant-consumer system in view of the current and near-term future conditions. Hence, the threshold GMC 864 indicates a need or requirement to irrigate. Similarly, the target GMC 866 may be calculated in like manner and, in view of the same or similar considerations, is identified as a GMC level which need not (or should not) be exceeded, and serves to trigger deactivation of an irrigation system.

The processor, via an irrigation control system of the particular participant-consumer system, may determine if a relevant irrigation system is currently active 870. If the irrigation system is active 882, the processor determines if the current inferred GMC is above the target GMC 884. If the target GMC 866 has been achieved, 886, the processor may cause the irrigation control center to deactivate the irrigation system 888 and enter a wait state 892. A duration of the wait state 892 may be fixed, or may be calculated in conjunction with the calculation of the threshold GMC 864 and/or target GMC 866. At the end of the wait state 892, the participant-consumer system may again request/receive data 810, etc. If the irrigation system is active 882 but the target GMC 866 has not been achieved 890, the wait state 892 is entered, leaving the irrigation system active.

If the irrigation system is not irrigating 872, and if 874 the GMC is below 876 the threshold GMC 864, the processor may cause the irrigation control center to activate 878 an irrigation system and then enter the wait state 892. On the other hand, if the irrigation system is not active 872 and the current inferred GMC 860 is not below 880 the threshold GMC 874, the wait state 892 may be entered without activating an irrigation system.

Figure 9:
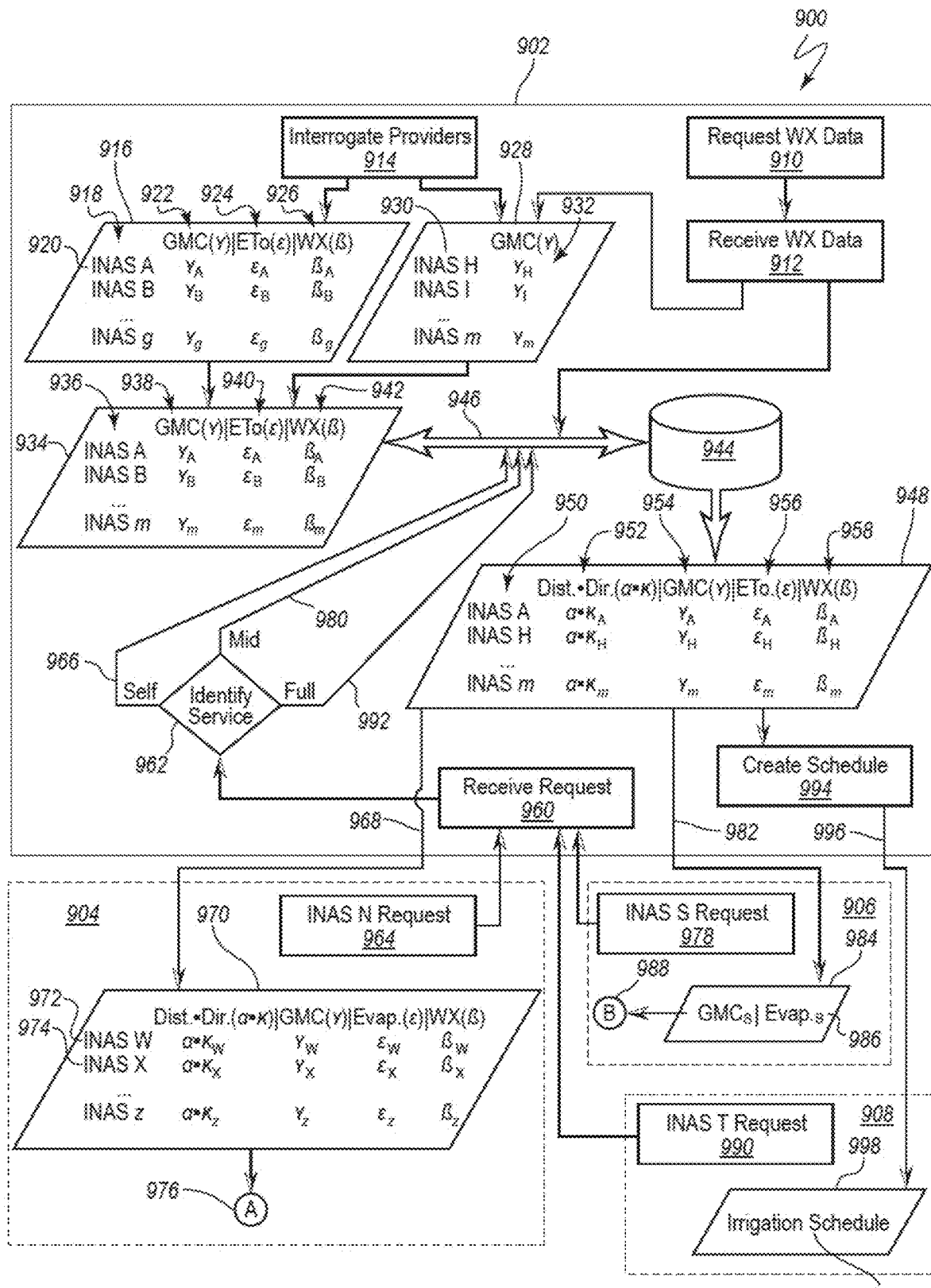
FIG. 9 is a flowchart of a method of irrigation needs assessment as may be utilized by an INAS network server, which is similar in at least some respects to the INAS network server of FIG. 1, and as described in various portions of the present disclosure.

FIG. 9 is a flowchart 900 of a method for assessing irrigation needs, such as may be utilized by an INAS network server (e.g., the INAS network server 112 of FIG. 1) and participant-consumer systems (which, in some respects, may be similar to the participant-consumer system 150 of FIG. 1). More particularly, the flowchart 900 represents a collection of services 902 performed by an INAS network server, and some of the client services performed by a variety of participant-consumer systems 904, 906, 908.

With respect to INAS network server services 902, the INAS network server may request 910 weather data from any of a local, regional, and national weather service, and may receive 912 weather data from one or more such weather services. The INAS network server may interrogate 914 participant-contributor systems associated to the particular INAS network server to request and receive data of each participant-contributor system. In one embodiment, a participant-contributor system may initiate transmission of data to the INAS network server. Such interrogation or transmission may occur at regular intervals, or upon a triggering event. A triggering event may be, e.g., a request or particularized request from a participant-consumer system, and incidence of unusual weather, etc. The INAS network server may receive from each participant-contributor system a datum or collection of data. More particularly, one or more participant-contributor systems may respond by sending to the INAS network server a plurality of data 916. The plurality of data 916 may include an INAS identifier 918 identifying the particular participant-contributor system, GMC 922 at the particular participant-contributor system, $ET_0$ 924 at the particular participant-contributor system, and weather 926 at the particular participant-contributor system. Generally, only a participant-contributor system equipped with local weather observation instrumentation will transmit weather data, as the INAS network server may request 910 and receive 912 from a weather service provider. One or more participant-contributor systems may send to the INAS network server data 928 comprising only an INAS identifier 930 identifying the particular participant-contributor system and GMC 932 at the particular participant-contributor system. As well as any other data sent to the INAS network server, each participant-contributor system may include a time reference for the data. The INAS network server may provide time synchronization service to each participant-contributor system (as well as to each participant-consumer system), and may employ an appropriate time service to identify a latency or anomaly in data sharing.

The data received from each participant-contributor system may be compiled and processed to generate a collection of provided data 934 representing participant-contributor systems associated to the INAS network server. The collection of provided data 934 may comprise an INAS identifier 936 for each participant-contributor system, a GMC 938, $ET_0$ 940, and weather 942 for the particular participant-contributor system and a time stamp. With regard to participant-contributor systems, which send only a GMC 932, the INAS network server may compute an $ET_0$ 940 based on available information, and weather data 942 as received 912 from a weather data provider.

The INAS network server may comprise a data storage system 944 and a communication system 946 to enable storing data in and retrieving data from the data storage system 944. The INAS network server may store the collection of provided data in the data storage system 944, and may periodically or aperiodically add to, update, or modify the collection of provided data 934 in the data storage system 944. Other data may be stored by the INAS network server related to each participant-contributor system, such as, e.g., geophysical data (location, altitude, terrain, etc.), crop data, etc. These additional data may be used by the INAS network server to, among other things, calculate GMC and/or $ET_0$ at participant-consumer system sites.

The INAS network server may receive a request 960 from a participant-consumer system. The INAS network server may identify a service level 962 for the particular requesting participant-consumer system. Based on the service level 962, 980, 992, the INAS network server may build a response comprising appropriate data for the particular requesting participant-consumer system.

In one example, a request 964 may be sent by INAS N 904, a participant-consumer system. The INAS network server receives the request 960 and identifies the service level 962 for the request. INAS N 904 may be a self-service 966 participant-consumer system. The INAS network server may retrieve current data 948 from the data storage system 944. The current data 948 may comprise an INAS identifier 950 for each currently reported participant-contributor system, the distance and direction 952 of the particular participant-contributor system relative to the requesting participant-consumer system, and the currently reported GMC 954, $ET_0$ 956, and weather 958. The INAS network server may send 968 the current data 948 to INAS N 904. As sent to INAS N 904, the INAS network server may obscure the identity of each participant-contributor system used to form the current data 948. In other words, INAS N 904 may receive an INAS identifier INAS W 972 which represents INAS A 920. Likewise, INAS N 904 may receive an INAS identifier INAS X 974, representative of a participant-contributor system INAS B through INAS m. It should be noted that the current data 948 sent to INAS N 904 may not comprise every INAS participant-contributor system associated to the INAS network server; however, generally, the INAS network server will send data of each participant-contributor system which the INAS network server computationally deems useful to INAS N 904 to calculate GMC at INAS N 904. INAS N 904 may then determine the GMC at INAS N 904 as discussed in conjunction with FIG. 8 (follow 976 in FIGS. 9 to 895 in FIG. 8). The communication between INAS N 904 and the INAS network server may be initiated either by INAS N, as the request 964, or by the INAS network server, and either may occur on a periodic or aperiodic basis.

In another example, a request 978 may be sent by INAS S 906, a participant-consumer system. The INAS network server receives the request 960 and identifies the service level 962 for the request. INAS S 906 may be a mid-level-service 980 participant-consumer system. The INAS network server may retrieve current data 948 from the data storage system 944 as described above. For a mid-level-service participant-consumer system such as INAS S 906, the INAS network server may send 982 particularized data 984. The particularized data 984 may be a current inferred GMC and/or inferred $ET_0$ 986 for INAS S 906. The INAS network server may determine the current inferred GMC and/or inferred $ET_0$ at INAS S 906 by calculations taking information of the current data 948 as inputs. The INAS network server may exclude data from each participant-contributor system not appropriate to determining the current GMC and/or $ET_0$ 986 at INAS S 906. INAS S 906 may operate further as described in conjunction with FIG. 8 (follow 988 in FIGS. 9 to 897 in FIG. 8).

In yet another example, a request 990 may be sent by INAS T 908, a participant-consumer system. The INAS network server receives the request 960 and identifies the service level 962 for the request. INAS T 908 may be a full-service 992 participant-consumer system. The INAS network server may retrieve current data 948 from the data storage system 944 as described above. For a full-service participant-consumer system such as INAS T 908, the INAS network server may send 996 particularized data 998. The particularized data 998 may be an irrigation schedule 999. The INAS network server may determine the irrigation schedule 999 for INAS T 908 by calculations taking as input information from the current data 948. The INAS network server may further employ information about INAS T 908, such as geophysical data (location, altitude, terrain, etc.), crop data, etc., to calculate a current GMC and/or $ET_0$, threshold and target GMCs, etc., in order to create 994 the irrigation schedule 999 for INAS T 908.

As may be apparent to one of skill in the art, the INAS network server may also store a collection of data in the data storage system comprising similar information described above relative to each participant-consumer system associated to the INAS network server. Such information may include an INAS identifier for each participant-consumer system, a service level, geophysical information (location, terrain, etc.), crop data, and records of all data sent to the particular participant-consumer system.

Figure 10:
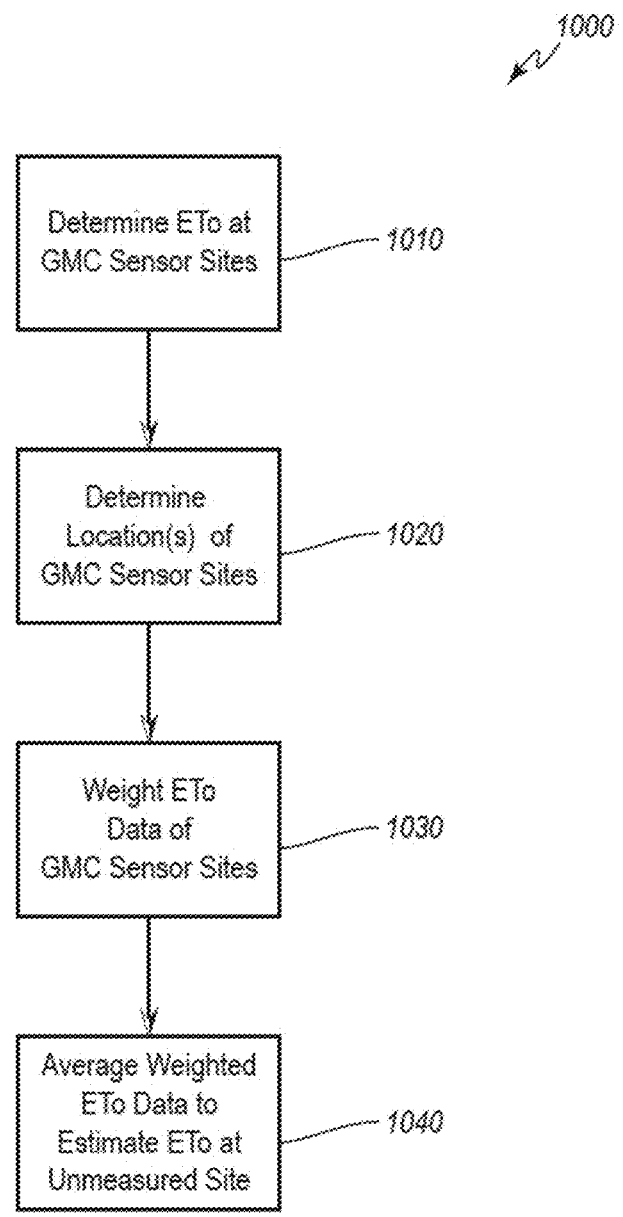
FIG. 10 is a flowchart of a method which may be used to compute an irrigation need for an unmeasured site, such as at an INAS participant-consumer system.

FIG. 10 is a flowchart of a method 1000 which may be used to compute $ET_0$ for an unmeasured site, such as at an INAS participant-consumer system. $ET_0$ may first be determined 1010 at GMC sensor sites of the INAS network to which the INAS participant-consumer system is associated. A location or distance of each GMC sensor site, relative to the particular INAS participant-consumer system is determined 1020. Additional relevant information may also be ascertained about each INAS participant-contributor system from GMC sensor data, such as elevation, terrain, soil composition, soil type, soil temperature, air temperature, humidity, microclimate (e.g., shade, full sun), dominant weather trend, crop type, crop maturity, etc. $ET_0$ of each GMC sensor site may be weighted 1030 by a relative distance or other relative physical characteristic from the particular INAS participant-consumer system. In other words, the nearer a GMC sensor site is to the particular INAS participant-consumer system, the greater weight is afforded the $ET_0$ of the GMC sensor site. Similarly, the more analogous an INAS participant-contributor system of each GMC sensor site to the particular participant-consumer system, the greater weight may be afforded to the $ET_0$ of the GMC sensor site. The weighted $ET_0$ values for the various GMC sensor sites may then be averaged 1040 to establish an imputed $ET_0$ at the particular participant-consumer system.

Figure 11:
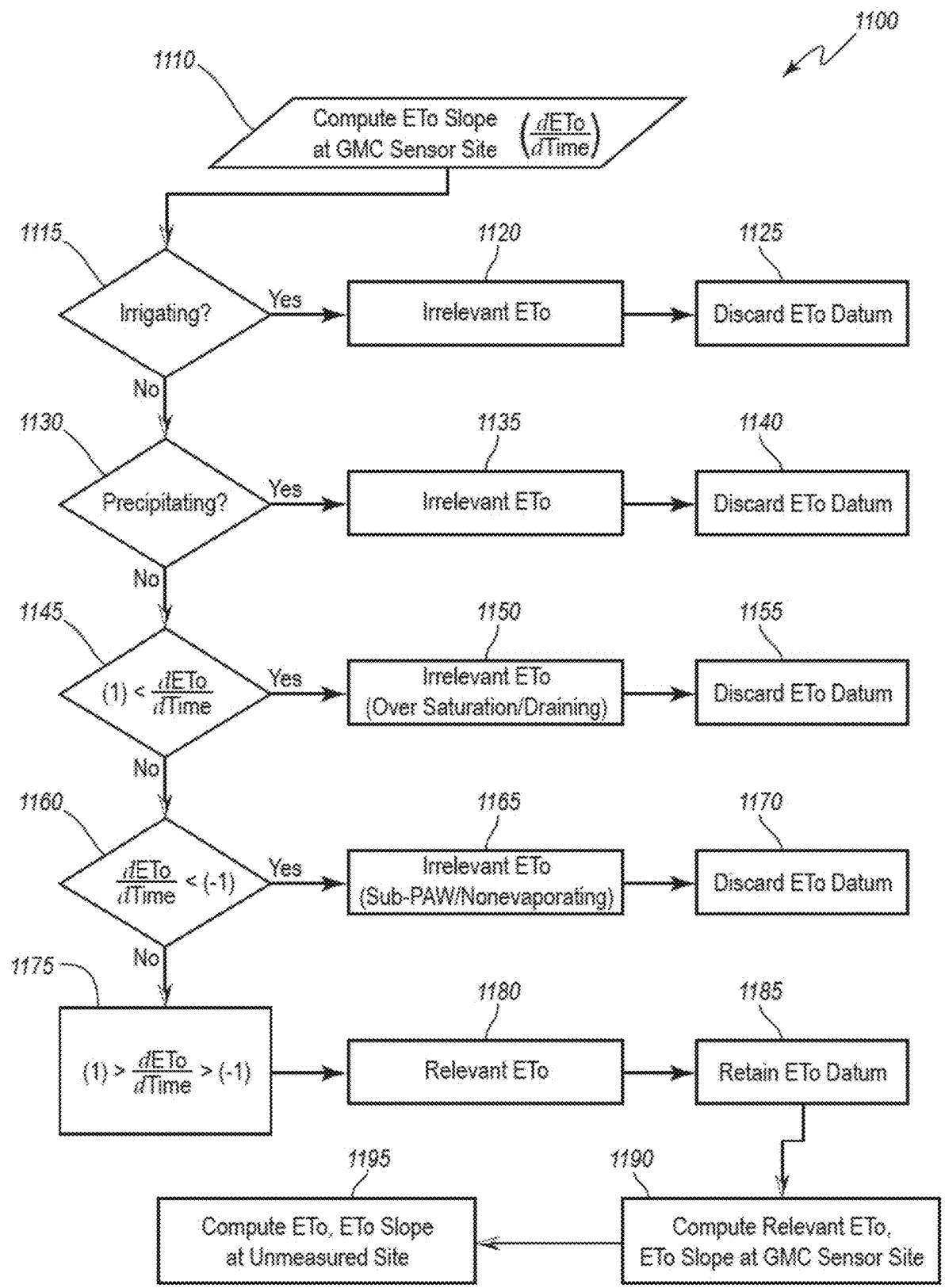
FIG. 11 is a flowchart of a method which may be used to compute an irrigation need at an unmeasured site, such as at an INAS participant-consumer system based on a computed irrigation need slope of a GMC sensor site.

FIG. 11 is a flowchart of a method 1100 which may be used to compute $ET_0$ (and $ET_0$ slope) at an unmeasured site, such as at an INAS participant-consumer system based on a computed $ET_0$ slope of a GMC sensor site. An $ET_0$ slope of a GMC sensor site may be computed 1110 based on a series of GMC measurements (or $ET_0$ calculations) over a period of time. By way of example without limitation, a derivative of the $ET_0$ (d $ET_0$/dTime) may be used to determine $ET_0$ slope. Similarly, $ET_0$ may be determined by the derivative or slope of the GMC measurements. A computed $ET_0$ for a GMC sensor site may comprise a plurality of discrete data, where each datum represents a current $ET_0$ at a particular time.

For each datum of the computed $ET_0$, the method considers 1115 whether the INAS participant-contributor system of the particular GMC sensor site was irrigating at the time of the datum. If irrigation was happening, the $ET_0$ datum may be determined to be irrelevant 1120 to the $ET_0$ at the unmeasured site and discarded 1125 from further consideration. Similarly, the method considers 1130 whether precipitation is falling at the GMC sensor site. If precipitating, the $ET_0$ datum may be determined to be irrelevant 1135 to the $ET_0$ at the unmeasured site and discarded 1140 from further consideration. For a datum in which the $ET_0$ slope is great enough, an inflection point may be identified 1145 wherein a condition of oversaturation has occurred. When the ground of a GMC sensor site is oversaturated, water may be draining away, which can cause an inaccurate determination of $ET_0$ (a skew). Such a datum may be determined to be irrelevant 1150 to the $ET_0$ at the unmeasured site and discarded 1155 from further consideration. Conversely, for a datum in which the derivative is sufficiently low, an inflection point may be identified 1160 wherein a condition of insubstantial evaporation is occurring as a result, e.g., of the GMC being less than the plant available water level for the particular soil, which can cause an inaccurate determination of $ET_0$ (a skew). Such a datum may be determined to be irrelevant 1165 to the $ET_0$ at the unmeasured site and may be discarded 1170 from further consideration.

In some embodiments, periods of oversaturation and insubstantial evaporation may be identified based on inflection points (i.e., changes in the slope of the $ET_0$). For example, an oversaturation period will feature a steep $ET_0$ slope, and once the extra water has run off, there will be a natural inflection point. Additionally, before oversaturation occurs, there would be a positive slope in $ET_0$ indicating a watering event (e.g., rain or irrigation). Thus, the oversaturation period may be identified as the period of time between a watering event (e.g., period of time with a positive $ET_0$ slope) and the inflection point indicating excess water runoff is complete.

Each datum surviving 1175 the foregoing discrimination issues may be determined to be relevant 1180 to computing $ET_0$ for the unmeasured INAS participant-consumer system site and retained 1185. Each retained datum (1185) may be used to compute 1190 a relevant $ET_0$ for the particular GMC sensor site. A relevant $ET_0$ may represent a datum reflecting actual evaporation of water under nominal conditions at the GMC sensor site, meaning the GMC sensor site was not being irrigated, was not receiving precipitation, was not oversaturated/draining water, and was not dehydrated to less than the level of plant available water. A plurality of relevant $ET_0$ data may be used to compute 1190 a relevant $ET_0$ curve at the GMC sensor site. Relevant $ET_0$ data from at least one GMC sensor site, and preferably from multiple GMC sensor sites, may be used to compute 1195 an $ET_0$ datum for the particular participant-consumer system site. In an example wherein multiple GMC sensor sites are used for computation of $ET_0$ at a particular participant-consumer system site, the computed $ET_0$ datum for each GMC sensor site may be weighted, as discussed elsewhere in this disclosure, in computing the $ET_0$ datum for the particular participant-consumer system site. A plurality of computed $ET_0$ data for the particular participant-consumer system site may be used to compute an $ET_0$ slope for the particular participant-consumer system site.

EXAMPLES

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1. An irrigation control system, comprising: a first in-ground moisture sensor at a first irrigation area; an irrigation controller to control irrigation by an irrigation system at a second irrigation area separate from the first irrigation area; and a processor to: receive ground moisture data from the first in-ground moisture sensor; determine a first irrigation need at the first in-ground moisture sensor based on the ground moisture data; and calculate a second irrigation need at the second irrigation area from the first irrigation need at the first in-ground moisture sensor based on a relationship between one or more physical characteristics of the first irrigation area and the second irrigation area, wherein the irrigation controller modifies irrigation at the second irrigation area based on the calculated second irrigation need.

Example 2. The irrigation control system of Example 1, wherein a different irrigation controller controls irrigation at the first irrigation area.

Example 3. The irrigation control system of Example 1, wherein the irrigation controller is further to control irrigation at the first irrigation area.

Example 4. The irrigation control system of Example 1, further comprising one or more additional in-ground moisture sensors at one or more additional irrigation areas, wherein to calculate the second irrigation need, the processor is further configured to: determine an additional irrigation need at each of the one or more additional irrigation areas; and calculate the second irrigation need based on the first irrigation need and the additional irrigation needs.

Example 5. The irrigation control system Example claim 1, further comprising one or more additional in-ground moisture sensors at one or more additional irrigation areas, wherein to calculate the second irrigation need, the processor is further configured to: determine an additional irrigation need at each of the one or more additional irrigation areas; weight the first irrigation need at the first irrigation area and weight the additional irrigation needs based on a relationship between one or more physical characteristics of the second irrigation area and each of the one or more additional irrigation areas; and calculate the second irrigation need based on the weighted first irrigation need and the weighted additional irrigation needs.

Example 6. The irrigation control system of Example 1, wherein the processor determines an irrigation schedule for the second irrigation area based on the calculated second irrigation need.

Example 7. The irrigation control system of Example 6, wherein the processor determines the irrigation schedule for the second irrigation area further based on a delivery capacity of the irrigation system at the first irrigation area.

Example 8. The irrigation control system of Example 6, wherein the processor determines the irrigation schedule for the second irrigation area further based on a delivery capacity of the irrigation system at the second irrigation area.

Example 9. The irrigation control system of Example 6, wherein the irrigation controller executes the irrigation schedule via the irrigation system at the second irrigation area.

Example 10. The irrigation control system of Example 1, wherein the processor receives plant water uptake data, and wherein the processor determines the first irrigation need further based on the plant water uptake data.

Example 11. The irrigation control system of Example 10, wherein the plant water uptake data corresponds to plants of the first irrigation area.

Example 12. The irrigation control system of Example 10, wherein the plant water uptake data corresponds to plants of the second irrigation area.

Example 13. The irrigation control system of Example 1, wherein the one or more physical characteristics comprises one or more of distance, soil type, soil temperature, air temperature, humidity crop type, solar radiation, wind speed, wind direction, precipitation, soil moisture content, and microclimate differences.

Example 14. The irrigation control system of Example 1, wherein the second irrigation need is calculated based on one or more historical patterns of one or more of the physical characteristics.

Example 15. The irrigation control system of Example 1, wherein the first irrigation need comprises an evapotranspiration rate and the second irrigation need comprises an estimated evapotranspiration rate.

Example 16. A method of irrigation control, comprising: receiving ground moisture data from one or more in-ground moisture sensors; calculating, via a first processor, an evaporation rate of water at each of the one or more in-ground moisture sensors; determining, based on the calculated evaporation rate of water at the one or more in-ground sensors, an estimated evaporation rate of water at an irrigation area outside of a range of measurement capability of the one or more in-ground moisture sensors; and controlling, via an irrigation controller, the irrigation system at the irrigation area based on the estimated evaporation rate of water at the irrigation area.

Example 17. The method of Example 16, further comprising: determining, based on the estimated evaporation rate of water at the irrigation area, an irrigation schedule for an irrigation system at the irrigation area, wherein controlling the irrigation system at the irrigation area is further according to the irrigation schedule.

Example 18. The method of Example 16, wherein determining the estimated evaporation rate comprises extrapolation.

Example 19. The method of claim 18, wherein the evaporation rate of water at the irrigation site is extrapolated by: weighting a calculated evaporation rate of water at each in-ground moisture sensor of the one or more in-ground moisture sensors based on a relationship between one or more physical characteristics of the irrigation area and one or more additional irrigation areas corresponding to the one or more in-ground moisture sensors; and averaging a weighted evaporation rate of water at each in-ground moisture sensor.

Example 20. An irrigation control system, comprising: a first in-ground moisture sensor at a first irrigation area; an irrigation controller to control irrigation by an irrigation system at a second irrigation area outside of a range of measurement capability of the first in-ground moisture sensor; a processor to: receive ground moisture data from the first in-ground moisture sensor; determine a first evaporation rate at the first in-ground moisture sensor based on the ground moisture data; and calculate an estimated evaporation rate of water at the second irrigation area from the first evaporation rate at the first in-ground moisture sensor based on a relationship between one or more physical characteristics of the first irrigation area and the second irrigation area, wherein the irrigation controller modifies irrigation at the second irrigation area based on the estimated evaporation rate.

Example 21. The irrigation control system of Example 20, wherein the processor receives plant water uptake data, wherein the processor determines an irrigation need at the second irrigation site based on the based on the estimated evaporation rate of water at the second irrigation site and the plant water uptake data, and wherein the irrigation controller modifies irrigation at the second irrigation area based on the irrigation need.

Example 22. The irrigation control system of Example 21, wherein the plant water uptake data corresponds to plants at the first irrigation area.

Example 23. The irrigation control system of Example 21, wherein the plant water uptake data corresponds to plants at the second irrigation area.

Example 24. The irrigation control system of Example 20, wherein the estimated evaporation rate of water at the second irrigation area is calculated using extrapolation from the first evaporation rate.

Example 25. The irrigation control system of claim 20, further comprising one or more additional in-ground moisture sensors at one or more additional irrigation areas, wherein to calculate the second irrigation need, the processor is further configured to: receive ground moisture data from the one or more additional in-ground moisture sensors; determine an additional estimated evaporation rate at each of the one or more additional irrigation areas based on the ground moisture data; and calculate the estimated evaporation rate based on the estimated evaporation rate and the additional estimated evaporation rates.

Example 26. The irrigation control system of Example 25, wherein the processor is further configured to: weight the first evaporation rate and each of the additional evaporation rates based on a relationship between one or more physical characteristics of the second irrigation area and each of the one or more additional irrigation area, wherein the estimated evaporation rate is calculated based on the weighted first evaporation rate and the weighted additional estimated evaporation rates.

It should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. A system for adaptive irrigation control, comprising:
an on-site ground moisture content sensor configured to collect soil moisture data from a first region within an irrigation site;
an irrigation needs assessment service (INAS) server configured to:
receive off-site environmental data, including regional evapotranspiration rates;
aggregate the soil moisture data and the off-site environmental data; and
determine, based on the aggregated data, soil moisture conditions for a second region within the irrigation site that lacks a ground moisture content sensor; and
an irrigation controller configured to adjust irrigation schedules for the second region based on the determined soil moisture conditions.

2. The system of claim 1, in which the off-site environmental data includes precipitation probabilities.

3. The system of claim 1, in which the off-site environmental data includes temperature forecasts.

4. The system of claim 1, in which the determination for the second region accounts for differences in soil type or topography between the first and second regions.

5. The system of claim 1, in which the irrigation controller calculates irrigation discharge rates for the second region based on the determined soil moisture conditions.

6. The system of claim 1, in which the INAS server dynamically updates the determination for the second region as new soil moisture or environmental data is received.

7. The system of claim 1, in which the INAS server communicates with a weather service via a network connection to update environmental data in real time.

8. The system of claim 1, in which a user interface is configured to display region-specific irrigation recommendations for manual approval, and the irrigation controller is configured to implement schedules based on approved recommendations.

9. The system of claim 1, in which the aggregation of soil moisture data includes excluding anomalous sensor readings based on a validation process.

10. The system of claim 1, in which the second region includes distinct areas, and the irrigation controller adjusts schedules for each area based on the determined soil moisture conditions.

11. A method for adaptive irrigation control, comprising:
collecting soil moisture data from a first region within an irrigation site using an on-site ground moisture content sensor;
receiving off-site environmental data, including regional evapotranspiration rates, at an irrigation needs assessment service (INAS) server;
aggregating the soil moisture data and the off-site environmental data;
determining, based on the aggregated data, soil moisture conditions for a second region within the irrigation site that lacks a ground moisture content sensor; and
adjusting irrigation schedules for the second region based on the determined soil moisture conditions.

12. The method of claim 11, further comprising receiving precipitation probabilities as part of the off-site environmental data.

13. The method of claim 11, further comprising receiving temperature forecasts as part of the off-site environmental data.

14. The method of claim 11, in which the determination for the second region accounts for differences in soil type or topography between the first and second regions.

15. The method of claim 11, further comprising calculating irrigation discharge rates for the second region based on the determined soil moisture conditions.

16. The method of claim 11, further comprising dynamically updating the determination for the second region as new soil moisture or environmental data is received.

17. The method of claim 11, further comprising communicating with a weather service via a network connection to update the off-site environmental data in real time.

18. The method of claim 11, further comprising displaying region-specific irrigation recommendations on a user interface for manual approval and implementing irrigation schedules based on approved recommendations.

19. The method of claim 11, in which the aggregation of soil moisture data includes excluding anomalous sensor readings based on a validation process.

20. The method of claim 11, in which the second region includes distinct areas, and further comprising adjusting irrigation schedules for each area based on the determined soil moisture conditions.

* * * * *